United States Patent
Grohman et al.

(10) Patent No.: US 8,798,796 B2
(45) Date of Patent: Aug. 5, 2014

(54) GENERAL CONTROL TECHNIQUES IN A HEATING, VENTILATION AND AIR CONDITIONING NETWORK

(75) Inventors: Wojciech Grohman, Little Elm, TX (US); Darko Hadzidedic, Plano, TX (US); Timothy H. Thorson, McKinney, TX (US); Muhammad Ali Mirza, Farmers Branch, TX (US); Ammar Kailani, Richardson, TX (US); Timothy E. Wallaert, Wylie, TX (US)

(73) Assignee: Lennox Industries Inc., Richardson, TX (US)

( * ) Notice: Subject to any disclaimer, the term of this patent is extended or adjusted under 35 U.S.C. 154(b) by 663 days.

(21) Appl. No.: 12/603,431

(22) Filed: Oct. 21, 2009

(65) Prior Publication Data

US 2010/0106309 A1    Apr. 29, 2010

Related U.S. Application Data

(63) Continuation-in-part of application No. 12/258,659, filed on Oct. 27, 2008.

(60) Provisional application No. 61/167,135, filed on Apr. 6, 2009.

(51) Int. Cl.
*G06F 19/00* (2011.01)
*G05D 23/24* (2006.01)
*G05D 27/02* (2006.01)

(52) U.S. Cl.
CPC ............ *G05D 27/02* (2013.01); *G05D 23/2439* (2013.01)
USPC .................................. 700/276; 62/79; 236/94

(58) Field of Classification Search
CPC ............. B60H 1/00007; B60H 3/0025; B60H 1/00642; F24F 5/0007; F24F 6/02; F24F 11/0012; G05B 2219/2638; G05D 23/1393
USPC ........... 700/276, 278; 62/79, 431, 181, 228.1; 236/49, 94; 165/242, 238, 217
See application file for complete search history.

(56) References Cited

U.S. PATENT DOCUMENTS

| | | |
|---|---|---|
| 4,048,491 A | 9/1977 | Wessman |
| 4,187,543 A | 2/1980 | Healey et al. |
| 4,231,352 A | 11/1980 | Bowden et al. |

(Continued)

FOREIGN PATENT DOCUMENTS

| | | |
|---|---|---|
| EP | 0980165 A2 | 2/2000 |
| EP | 1956311 A2 | 8/2008 |

(Continued)

OTHER PUBLICATIONS

Related case U.S. Appl. No. 12/603,508, filed Oct. 21, 2009 to Wojciech Grohman, entitled "Alarm and Diagnostics System and Method for a Distributed-Architecture Heating, Ventilation and Air Conditioning Network".

(Continued)

*Primary Examiner* — Kidest Bahta

(57) ABSTRACT

The disclosure provides an HVAC data processing and communication network. In various embodiments of systems and methods including a bus, a compressor is coupled to the bus, and a subnet controller is coupled to the bus. The subnet controller disables the compressor when acting upon a dehumidification command.

20 Claims, 7 Drawing Sheets

(56) References Cited

U.S. PATENT DOCUMENTS

| | | |
|---|---|---|
| 4,262,736 A | 4/1981 | Gilkeson et al. |
| 4,296,464 A | 10/1981 | Woods et al. |
| 4,381,549 A | 4/1983 | Stamp et al. |
| 4,464,543 A | 8/1984 | Kline et al. |
| 4,482,785 A | 11/1984 | Finnegan et al. |
| 4,497,031 A | 1/1985 | Froehling et al. |
| 4,501,125 A | 2/1985 | Han |
| 4,606,042 A | 8/1986 | Kahn et al. |
| 4,616,325 A | 10/1986 | Heckenbach et al. |
| 4,694,394 A | 9/1987 | Costantini |
| 4,698,628 A | 10/1987 | Herkert et al. |
| 4,703,325 A | 10/1987 | Chamberlin et al. |
| 4,706,247 A | 11/1987 | Yoshioka |
| 4,723,239 A | 2/1988 | Schwartz |
| 4,829,447 A | 5/1989 | Parker et al. |
| 4,841,450 A | 6/1989 | Fredriksson |
| 4,843,084 A | 6/1989 | Parker et al. |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,967,567 A | 11/1990 | Proctor et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,039,980 A | 8/1991 | Aggers et al. |
| 5,042,997 A | 8/1991 | Rhodes |
| 5,058,388 A | 10/1991 | Shaw et al. |
| 5,061,916 A | 10/1991 | French et al. |
| 5,065,813 A | 11/1991 | Berkeley et al. |
| 5,086,385 A | 2/1992 | Launey et al. |
| 5,103,896 A | 4/1992 | Saga |
| 5,105,366 A | 4/1992 | Beckey |
| 5,115,967 A | 5/1992 | Wedekind |
| 5,128,855 A | 7/1992 | Hilber et al. |
| 5,165,465 A | 11/1992 | Kenet |
| 5,170,935 A | 12/1992 | Federspiel et al. |
| 5,180,102 A | 1/1993 | Gilbert et al. |
| 5,181,653 A | 1/1993 | Foster et al. |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,259,553 A | 11/1993 | Shyu |
| 5,274,571 A | 12/1993 | Hessee et al. |
| 5,276,630 A | 1/1994 | Baldwin et al. |
| 5,277,036 A | 1/1994 | Dieckmann et al. |
| 5,278,957 A | 1/1994 | Chan |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,341,988 A | 8/1994 | Rein et al. |
| 5,355,323 A | 10/1994 | Bae |
| 5,361,982 A | 11/1994 | Liebi et al. |
| 5,374,200 A | 12/1994 | Giroux |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,434,965 A | 7/1995 | Matheny et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,449,112 A | 9/1995 | Heitman et al. |
| 5,450,570 A | 9/1995 | Richek et al. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,475,364 A | 12/1995 | Kenet |
| 5,481,481 A | 1/1996 | Frey et al. |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,511,188 A | 4/1996 | Pascucci et al. |
| 5,513,324 A | 4/1996 | Dolin, Jr. et al. |
| 5,515,267 A | 5/1996 | Alsenz |
| 5,520,328 A | 5/1996 | Bujak, Jr. |
| 5,522,044 A | 5/1996 | Pascucci et al. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown et al. |
| 5,544,809 A | 8/1996 | Keating et al. |
| 5,550,980 A | 8/1996 | Pascucci et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,157 A | 3/1997 | Davidson et al. |
| 5,613,369 A | 3/1997 | Sato et al. |
| 5,617,282 A | 4/1997 | Rall et al. |
| 5,621,662 A | 4/1997 | Humphries et al. |
| 5,628,201 A | 5/1997 | Bahel et al. |
| 5,630,325 A | 5/1997 | Bahel et al. |
| 5,631,825 A | 5/1997 | van Weele et al. |
| 5,634,590 A | 6/1997 | Gorski et al. |
| 5,675,756 A | 10/1997 | Benton et al. |
| 5,675,830 A | 10/1997 | Satula |
| 5,684,463 A | 11/1997 | Diercks et al. |
| 5,684,717 A | 11/1997 | Beilfuss et al. |
| 5,699,243 A | 12/1997 | Eckel et al. |
| 5,706,190 A | 1/1998 | Russ et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,729,442 A | 3/1998 | Frantz |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |

(56) References Cited

U.S. PATENT DOCUMENTS

| | | |
|---|---|---|
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,784,647 A | 7/1998 | Sugimoto |
| 5,786,993 A | 7/1998 | Frutiger et al. |
| 5,787,027 A | 7/1998 | Dolan et al. |
| 5,791,332 A | 8/1998 | Thompson et al. |
| 5,793,646 A | 8/1998 | Hibberd et al. |
| 5,801,942 A | 9/1998 | Nixon et al. |
| 5,802,485 A | 9/1998 | Koelle et al. |
| 5,803,357 A | 9/1998 | Lakin |
| 5,809,063 A | 9/1998 | Ashe et al. |
| 5,809,556 A | 9/1998 | Fujisawa et al. |
| 5,810,245 A | 9/1998 | Heitman et al. |
| 5,816,492 A | 10/1998 | Charles et al. |
| 5,818,347 A | 10/1998 | Dolan et al. |
| 5,819,845 A | 10/1998 | Ryu et al. |
| 5,822,512 A | 10/1998 | Goodrum et al. |
| 5,826,038 A | 10/1998 | Nakazumi |
| 5,829,674 A | 11/1998 | Vanostrand et al. |
| 5,841,654 A | 11/1998 | Verissimo et al. |
| 5,848,887 A | 12/1998 | Zabielski et al. |
| 5,854,744 A | 12/1998 | Zeng et al. |
| 5,856,972 A | 1/1999 | Riley et al. |
| 5,860,411 A | 1/1999 | Thompson et al. |
| 5,860,473 A | 1/1999 | Seiden |
| 5,862,052 A | 1/1999 | Nixon et al. |
| 5,862,411 A | 1/1999 | Kay et al. |
| 5,864,581 A | 1/1999 | Alger-Meunier et al. |
| 5,873,519 A | 2/1999 | Beilfuss |
| 5,878,236 A | 3/1999 | Kleineberg et al. |
| 5,883,627 A | 3/1999 | Pleyer |
| 5,884,072 A | 3/1999 | Rasmussen |
| 5,887,651 A | 3/1999 | Meyer |
| 5,892,690 A | 4/1999 | Boatman et al. |
| 5,896,304 A | 4/1999 | Tiemann et al. |
| 5,900,674 A | 5/1999 | Wojnarowski et al. |
| 5,903,454 A | 5/1999 | Hoffberg et al. |
| 5,912,877 A | 6/1999 | Shirai et al. |
| 5,914,453 A | 6/1999 | James et al. |
| 5,915,101 A | 6/1999 | Kleineberg et al. |
| 5,924,486 A | 7/1999 | Ehlers et al. |
| 5,927,398 A * | 7/1999 | Maciulewicz ............... 165/209 |
| 5,930,249 A | 7/1999 | Stademann et al. |
| 5,933,655 A | 8/1999 | Vrabec et al. |
| 5,934,554 A | 8/1999 | Charles et al. |
| 5,937,942 A | 8/1999 | Bias et al. |
| 5,946,209 A | 8/1999 | Eckel et al. |
| 5,962,989 A | 10/1999 | Baker |
| 5,971,597 A | 10/1999 | Baldwin et al. |
| 5,973,594 A | 10/1999 | Baldwin et al. |
| 5,974,554 A | 10/1999 | Oh |
| 5,976,010 A | 11/1999 | Reese et al. |
| 5,983,353 A | 11/1999 | McHann, Jr. |
| 5,983,646 A | 11/1999 | Grothe et al. |
| 5,993,195 A | 11/1999 | Thompson |
| 6,006,142 A | 12/1999 | Seem et al. |
| 6,011,821 A | 1/2000 | Sauer et al. |
| 6,021,252 A | 2/2000 | Faris et al. |
| 6,028,864 A | 2/2000 | Marttinen et al. |
| 6,032,178 A | 2/2000 | Bacigalupo et al. |
| 6,035,024 A | 3/2000 | Stumer |
| 6,046,410 A | 4/2000 | Wojnarowski et al. |
| 6,049,817 A | 4/2000 | Schoen et al. |
| 6,052,525 A | 4/2000 | Carlson et al. |
| 6,053,416 A | 4/2000 | Specht et al. |
| 6,061,600 A | 5/2000 | Ying |
| 6,061,603 A | 5/2000 | Papadopoulos et al. |
| 6,078,660 A | 6/2000 | Burgess |
| 6,082,894 A | 7/2000 | Batko et al. |
| 6,092,280 A | 7/2000 | Wojnarowski |
| 6,095,674 A | 8/2000 | Verissimo et al. |
| 6,098,116 A | 8/2000 | Nixon et al. |
| 6,101,824 A | 8/2000 | Meyer et al. |
| 6,110,260 A | 8/2000 | Kubokawa |
| 6,115,713 A | 9/2000 | Pascucci et al. |
| 6,138,227 A | 10/2000 | Thewes et al. |
| 6,141,595 A | 10/2000 | Gloudeman et al. |
| 6,145,501 A | 11/2000 | Manohar et al. |
| 6,145,751 A | 11/2000 | Ahmed |
| 6,147,601 A | 11/2000 | Sandelman et al. |
| 6,151,298 A | 11/2000 | Bernhardsson et al. |
| 6,151,529 A | 11/2000 | Batko |
| 6,151,625 A | 11/2000 | Swales et al. |
| 6,151,650 A | 11/2000 | Birzer |
| 6,155,341 A | 12/2000 | Thompson et al. |
| 6,160,477 A | 12/2000 | Sandelman et al. |
| 6,160,484 A | 12/2000 | Spahl et al. |
| 6,160,795 A | 12/2000 | Hosemann |
| 6,167,338 A | 12/2000 | De Wille et al. |
| 6,169,937 B1 | 1/2001 | Peterson |
| 6,169,964 B1 | 1/2001 | Alsa et al. |
| 6,170,044 B1 | 1/2001 | McLaughlin et al. |
| 6,177,945 B1 | 1/2001 | Pleyer |
| 6,179,213 B1 | 1/2001 | Gibino et al. |
| 6,182,130 B1 | 1/2001 | Dolin, Jr. et al. |
| 6,188,642 B1 | 2/2001 | Schoniger et al. |
| 6,190,442 B1 | 2/2001 | Redner |
| 6,208,905 B1 | 3/2001 | Giddings et al. |
| 6,208,924 B1 | 3/2001 | Bauer |
| 6,211,782 B1 | 4/2001 | Sandelman et al. |
| 6,216,066 B1 | 4/2001 | Goebel et al. |
| 6,227,191 B1 | 5/2001 | Garloch |
| 6,232,604 B1 | 5/2001 | McDaniel et al. |
| 6,237,113 B1 | 5/2001 | Daiber |
| 6,240,326 B1 | 5/2001 | Gloudeman et al. |
| 6,241,156 B1 | 6/2001 | Kline et al. |
| 6,252,890 B1 | 6/2001 | Alger-Meunier et al. |
| 6,254,009 B1 | 7/2001 | Proffitt et al. |
| 6,266,205 B1 | 7/2001 | Schreck et al. |
| 6,269,127 B1 | 7/2001 | Richards |
| 6,271,845 B1 | 8/2001 | Richardson |
| 6,282,454 B1 | 8/2001 | Papadopoulos et al. |
| 6,285,912 B1 | 9/2001 | Ellison et al. |
| 6,292,518 B1 | 9/2001 | Grabb et al. |
| 6,298,376 B1 | 10/2001 | Rosner et al. |
| 6,298,454 B1 | 10/2001 | Schleiss et al. |
| 6,298,551 B1 | 10/2001 | Wojnarowski et al. |
| 6,304,557 B1 | 10/2001 | Nakazumi |
| 6,307,331 B1 | 10/2001 | Bonasia et al. |
| 6,324,008 B1 | 11/2001 | Baldwin et al. |
| 6,324,854 B1 | 12/2001 | Jayanth |
| 6,336,065 B1 | 1/2002 | Gibson et al. |
| 6,343,236 B1 | 1/2002 | Gibson et al. |
| 6,349,306 B1 | 2/2002 | Malik et al. |
| 6,349,883 B1 | 2/2002 | Simmons et al. |
| 6,353,775 B1 | 3/2002 | Nichols |
| 6,359,220 B2 | 3/2002 | Schiedegger et al. |
| 6,363,422 B1 | 3/2002 | Hunter et al. |
| 6,370,037 B1 | 4/2002 | Schoenfish |
| 6,374,373 B1 | 4/2002 | Heim et al. |
| 6,377,283 B1 | 4/2002 | Thomas |
| 6,385,510 B1 | 5/2002 | Hoog et al. |
| 6,390,806 B1 | 5/2002 | Dempsey et al. |
| 6,393,023 B1 | 5/2002 | Shimizu et al. |
| 6,400,996 B1 | 6/2002 | Hoffberg et al. |
| 6,405,104 B1 | 6/2002 | Dougherty |
| 6,408,228 B1 | 6/2002 | Seem et al. |
| 6,411,701 B1 | 6/2002 | Stademann |
| 6,411,857 B1 | 6/2002 | Flood |
| 6,412,435 B1 | 7/2002 | Timmons, Jr. |
| 6,415,395 B1 | 7/2002 | Varma et al. |
| 6,418,507 B1 | 7/2002 | Fackler |
| 6,423,118 B1 | 7/2002 | Becerra et al. |
| 6,424,872 B1 | 7/2002 | Glanzer et al. |
| 6,424,874 B1 | 7/2002 | Cofer |
| 6,427,454 B1 * | 8/2002 | West .................................. 62/93 |
| 6,429,845 B1 | 8/2002 | Unseld et al. |
| 6,430,953 B2 | 8/2002 | Roh |
| 6,434,715 B1 | 8/2002 | Andersen |
| 6,435,418 B1 | 8/2002 | Toth et al. |
| 6,437,691 B1 | 8/2002 | Sandelman et al. |
| 6,437,805 B1 | 8/2002 | Sojoodi et al. |

(56) References Cited

U.S. PATENT DOCUMENTS

| | | |
|---|---|---|
| 6,441,723 B1 | 8/2002 | Mansfield et al. |
| 6,442,952 B2 | 9/2002 | Roh et al. |
| 6,448,896 B1 | 9/2002 | Bankus et al. |
| 6,449,315 B2 | 9/2002 | Richards |
| 6,450,409 B1 | 9/2002 | Rowlette et al. |
| 6,453,374 B1 | 9/2002 | Kovalan et al. |
| 6,454,177 B1 | 9/2002 | Sasao et al. |
| 6,462,654 B1 | 10/2002 | Sandelman et al. |
| 6,478,084 B1 | 11/2002 | Kumar et al. |
| 6,493,661 B1 | 12/2002 | White et al. |
| 6,497,570 B1 | 12/2002 | Sears et al. |
| 6,498,844 B1 | 12/2002 | Stademann |
| 6,501,995 B1 | 12/2002 | Kinney et al. |
| 6,504,338 B1 | 1/2003 | Eichorn |
| 6,505,087 B1 | 1/2003 | Lucas et al. |
| 6,508,407 B1 | 1/2003 | Lefkowitz et al. |
| 6,526,122 B2 | 2/2003 | Matsushita et al. |
| 6,535,123 B2 | 3/2003 | Sandelman et al. |
| 6,535,138 B1 | 3/2003 | Dolan et al. |
| 6,539,489 B1 | 3/2003 | Reinert |
| 6,540,148 B1 | 4/2003 | Salsbury et al. |
| 6,542,462 B1 | 4/2003 | Sohraby et al. |
| 6,543,007 B1 | 4/2003 | Bliley et al. |
| 6,545,660 B1 | 4/2003 | Shen et al. |
| 6,546,008 B1 | 4/2003 | Wehrend |
| 6,552,647 B1 | 4/2003 | Thiessen et al. |
| 6,554,198 B1 | 4/2003 | Hull et al. |
| 6,560,976 B2 | 5/2003 | Jayanth |
| 6,564,348 B1 | 5/2003 | Barenys et al. |
| 6,567,476 B2 | 5/2003 | Kohl et al. |
| 6,572,363 B1 | 6/2003 | Virgil, Jr. et al. |
| 6,574,215 B2 | 6/2003 | Hummel |
| 6,574,234 B1 | 6/2003 | Myer et al. |
| 6,574,581 B1 | 6/2003 | Bohrer et al. |
| 6,575,233 B1 | 6/2003 | Krumnow |
| 6,580,950 B1 | 6/2003 | Johnson et al. |
| 6,587,039 B1 | 7/2003 | Woestemeyer et al. |
| 6,587,739 B1 | 7/2003 | Abrams et al. |
| 6,587,884 B1 | 7/2003 | Papadopoulos et al. |
| 6,594,272 B1 | 7/2003 | Ketcham et al. |
| 6,595,430 B1 | 7/2003 | Shah |
| 6,600,923 B1 | 7/2003 | Dzuban |
| 6,608,560 B2 | 8/2003 | Abrams |
| 6,609,127 B1 | 8/2003 | Lee et al. |
| 6,615,088 B1 | 9/2003 | Myer et al. |
| 6,615,594 B2 | 9/2003 | Jayanth et al. |
| 6,618,394 B1 | 9/2003 | Hilleary |
| 6,619,555 B2 | 9/2003 | Rosen |
| 6,621,507 B1 | 9/2003 | Shah |
| 6,622,926 B1 | 9/2003 | Sartain et al. |
| 6,628,993 B1 | 9/2003 | Bauer |
| 6,633,781 B1 | 10/2003 | Lee et al. |
| 6,636,771 B1 | 10/2003 | Varma et al. |
| 6,639,939 B1 | 10/2003 | Naden et al. |
| 6,640,145 B2 | 10/2003 | Hoffberg et al. |
| 6,640,890 B1 | 11/2003 | Dage et al. |
| 6,643,689 B2 | 11/2003 | Rode et al. |
| 6,644,557 B1 | 11/2003 | Jacobs |
| 6,647,317 B2 | 11/2003 | Takai et al. |
| 6,650,949 B1 | 11/2003 | Fera et al. |
| 6,651,034 B1 | 11/2003 | Hedlund et al. |
| 6,658,373 B2 | 12/2003 | Rossi et al. |
| RE38,406 E | 1/2004 | Faris et al. |
| 6,681,215 B2 | 1/2004 | Jammu |
| 6,688,387 B1 | 2/2004 | Wellington et al. |
| 6,704,688 B2 | 3/2004 | Aslam et al. |
| 6,708,239 B1 | 3/2004 | Ellerbrock et al. |
| 6,715,120 B1 | 3/2004 | Hladik et al. |
| 6,715,302 B2 | 4/2004 | Ferragut, II |
| 6,715,690 B2 | 4/2004 | Hull et al. |
| 6,717,513 B1 | 4/2004 | Sandelman et al. |
| 6,717,919 B1 | 4/2004 | Ketcham et al. |
| 6,718,384 B2 | 4/2004 | Linzy |
| 6,722,143 B2 | 4/2004 | Moon et al. |
| 6,725,180 B2 | 4/2004 | Mayer et al. |
| 6,725,398 B1 | 4/2004 | Varma et al. |
| 6,728,369 B2 | 4/2004 | Burgess |
| 6,732,191 B1 | 5/2004 | Baker et al. |
| 6,735,196 B1 | 5/2004 | Manzardo |
| 6,735,282 B2 | 5/2004 | Matsushita et al. |
| 6,735,965 B2 | 5/2004 | Moon et al. |
| 6,738,676 B2 | 5/2004 | Hirayama |
| 6,741,915 B2 | 5/2004 | Poth |
| 6,744,771 B1 | 6/2004 | Barber et al. |
| 6,745,106 B2 | 6/2004 | Howard et al. |
| 6,747,888 B2 | 6/2004 | Klein |
| 6,758,050 B2 | 7/2004 | Jayanth et al. |
| 6,758,051 B2 | 7/2004 | Jayanth et al. |
| 6,763,040 B1 | 7/2004 | Hite et al. |
| 6,763,272 B2 | 7/2004 | Knepper |
| 6,765,993 B2 | 7/2004 | Cueman |
| 6,768,732 B1 | 7/2004 | Neuhaus |
| 6,774,786 B1 | 8/2004 | Havekost et al. |
| 6,779,176 B1 | 8/2004 | Chambers, II et al. |
| 6,783,079 B2 | 8/2004 | Carey et al. |
| 6,789,739 B2 | 9/2004 | Rosen |
| 6,791,530 B2 | 9/2004 | Vernier et al. |
| 6,795,935 B1 | 9/2004 | Unkle et al. |
| 6,798,341 B1 | 9/2004 | Eckel et al. |
| 6,801,524 B2 | 10/2004 | Eteminan |
| 6,804,564 B2 | 10/2004 | Crispin et al. |
| 6,810,333 B2 | 10/2004 | Adedeji et al. |
| 6,814,299 B1 | 11/2004 | Carey |
| 6,814,660 B1 | 11/2004 | Cavett |
| 6,816,071 B2 | 11/2004 | Conti |
| 6,817,757 B1 | 11/2004 | Wallace |
| 6,819,802 B2 | 11/2004 | Higgs et al. |
| 6,822,202 B2 | 11/2004 | Atlas |
| 6,823,680 B2 | 11/2004 | Jayanth |
| 6,824,069 B2 | 11/2004 | Rosen |
| 6,826,454 B2 | 11/2004 | Sulfstede |
| 6,826,590 B1 | 11/2004 | Glanzer et al. |
| 6,832,118 B1 | 12/2004 | Heberlein et al. |
| 6,833,787 B1 | 12/2004 | Levi |
| 6,833,844 B1 | 12/2004 | Shiota et al. |
| 6,840,052 B2 | 1/2005 | Smith et al. |
| 6,842,117 B2 | 1/2005 | Keown |
| 6,842,808 B2 | 1/2005 | Weigl et al. |
| 6,845,918 B2 | 1/2005 | Rotondo |
| 6,850,992 B2 | 2/2005 | Heinrich et al. |
| 6,851,948 B2 | 2/2005 | Dempsey et al. |
| 6,853,291 B1 | 2/2005 | Aisa |
| 6,854,444 B2 | 2/2005 | Plagge et al. |
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Leighton et al. |
| 6,868,292 B2 | 3/2005 | Ficco et al. |
| 6,868,900 B2 | 3/2005 | Dage et al. |
| 6,874,691 B1 | 4/2005 | Hildebrand et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,914,893 B2 | 7/2005 | Petite |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,944,785 B2 | 9/2005 | Gadir et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |
| 6,956,424 B2 | 10/2005 | Hohnel |
| 6,957,696 B1 | 10/2005 | Krumnow |

(56) References Cited

U.S. PATENT DOCUMENTS

| | | |
|---|---|---|
| 6,963,288 B1 | 11/2005 | Sokol et al. |
| 6,963,922 B2 | 11/2005 | Papadopoulos et al. |
| 6,965,802 B2 | 11/2005 | Sexton |
| 6,967,565 B2 | 11/2005 | Lingemann |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,002,462 B2 | 2/2006 | Welch |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |
| 7,022,008 B1 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,027,808 B2 | 4/2006 | Wesby |
| 7,029,391 B2 | 4/2006 | Nagaya et al. |
| 7,031,880 B1 | 4/2006 | Seem et al. |
| 7,032,018 B2 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 | 5/2006 | Wimsatt |
| 7,051,282 B2 | 5/2006 | Marcjan |
| 7,055,759 B2 | 6/2006 | Wacker et al. |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 | 8/2006 | Pouchak |
| 7,085,626 B2 | 8/2006 | Harrod et al. |
| 7,085,814 B1 | 8/2006 | Gandhi et al. |
| 7,089,087 B2 | 8/2006 | Dudley |
| 7,089,088 B2 | 8/2006 | Terry et al. |
| 7,089,530 B1 | 8/2006 | Dardinski et al. |
| 7,092,768 B1 | 8/2006 | Labuda |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,096,465 B1 | 8/2006 | Dardinski et al. |
| 7,099,965 B2 | 8/2006 | Ellerbrock et al. |
| 7,100,382 B2 | 9/2006 | Butler et al. |
| 7,103,000 B1 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,127,327 B1 | 10/2006 | O'Donnell |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,142,948 B2 | 11/2006 | Metz |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,154,866 B2 | 12/2006 | Shurmantine et al. |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,172,160 B2 | 2/2007 | Piel et al. |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al. |
| 7,213,044 B2 | 5/2007 | Tjong et al. |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |
| 7,222,111 B1 | 5/2007 | Budike, Jr. |
| 7,222,152 B1 | 5/2007 | Thompson et al. |
| 7,222,493 B2 | 5/2007 | Jayanth et al. |
| 7,222,494 B2 | 5/2007 | Peterson et al. |
| 7,224,366 B2 | 5/2007 | Kessler et al. |
| 7,225,054 B2 | 5/2007 | Amundson et al. |
| 7,225,356 B2 | 5/2007 | Monitzer |
| 7,228,187 B2 | 6/2007 | Ticky et al. |
| 7,232,058 B2 | 6/2007 | Lee |
| 7,233,229 B2 | 6/2007 | Stroupe et al. |
| 7,239,623 B2 | 7/2007 | Burghardt et al. |
| 7,242,988 B1 | 7/2007 | Hoffberg et al. |

(56) References Cited

U.S. PATENT DOCUMENTS

| | | | |
|---|---|---|---|
| 7,243,004 B2 | 7/2007 | Shah et al. | |
| 7,244,294 B2 | 7/2007 | Kates | |
| 7,246,753 B2 | 7/2007 | Hull et al. | |
| 7,248,576 B2 | 7/2007 | Hoffmann | |
| 7,251,534 B2 | 7/2007 | Walls et al. | |
| 7,257,813 B1 | 8/2007 | Mayer et al. | |
| 7,259,666 B1 | 8/2007 | Hermsmeyer et al. | |
| 7,260,084 B2 | 8/2007 | Saller | |
| 7,260,451 B2 | 8/2007 | Takai et al. | |
| 7,260,609 B2 | 8/2007 | Fuehrer et al. | |
| 7,260,948 B2 | 8/2007 | Jayanth et al. | |
| 7,261,241 B2 | 8/2007 | Eoga | |
| 7,261,243 B2 | 8/2007 | Butler et al. | |
| 7,261,762 B2 | 8/2007 | Kang et al. | |
| 7,266,775 B2 | 9/2007 | Patitucci | |
| 7,266,960 B2 | 9/2007 | Shah | |
| 7,269,962 B2 | 9/2007 | Bachmann | |
| 7,272,154 B2 | 9/2007 | Loebig | |
| 7,272,452 B2 | 9/2007 | Coogan et al. | |
| 7,272,457 B2 | 9/2007 | Glanzer et al. | |
| 7,274,972 B2 | 9/2007 | Amundson et al. | |
| 7,274,973 B2 | 9/2007 | Nichols et al. | |
| 7,277,280 B2 | 10/2007 | Peng | |
| 7,277,970 B2 | 10/2007 | Ellerbrock et al. | |
| 7,278,103 B1 | 10/2007 | Clark et al. | |
| 7,281,697 B2 | 10/2007 | Reggiani | |
| 7,287,062 B2 | 10/2007 | Im et al. | |
| 7,287,708 B2 | 10/2007 | Lucas et al. | |
| 7,287,709 B2 | 10/2007 | Proffitt et al. | |
| 7,289,458 B2 | 10/2007 | Gila et al. | |
| 7,292,900 B2 | 11/2007 | Kreidler et al. | |
| 7,293,422 B2 | 11/2007 | Parachini et al. | |
| 7,295,099 B2 | 11/2007 | Lee et al. | |
| 7,296,426 B2 | 11/2007 | Butler et al. | |
| 7,299,279 B2 | 11/2007 | Sadaghiany | |
| 7,299,996 B2 | 11/2007 | Garrett et al. | |
| 7,301,699 B2 | 11/2007 | Kanamori et al. | |
| 7,302,642 B2 | 11/2007 | Smith et al. | |
| 7,305,495 B2 | 12/2007 | Carter | |
| 7,306,165 B2 | 12/2007 | Shah | |
| 7,310,559 B2 | 12/2007 | Walko, Jr. | |
| 7,313,465 B1 | 12/2007 | O'Donnell | |
| 7,313,716 B2 | 12/2007 | Weigl et al. | |
| 7,313,923 B2 | 1/2008 | Jayanth et al. | |
| 7,315,768 B2 | 1/2008 | Dang et al. | |
| 7,317,970 B2 | 1/2008 | Pienta et al. | |
| 7,318,089 B1 | 1/2008 | Stachura et al. | |
| 7,320,110 B2 | 1/2008 | Shah | |
| 7,324,874 B2 | 1/2008 | Jung | |
| 7,327,376 B2 | 2/2008 | Shen et al. | |
| 7,327,815 B1 | 2/2008 | Jurisch | |
| 7,330,512 B2 | 2/2008 | Frank et al. | |
| 7,331,191 B2 | 2/2008 | He et al. | |
| 7,334,161 B2 | 2/2008 | Williams et al. | |
| 7,336,650 B2 | 2/2008 | Franz et al. | |
| 7,337,191 B2 | 2/2008 | Haeberle et al. | |
| 7,337,369 B2 | 2/2008 | Barthel et al. | |
| 7,337,619 B2 | 3/2008 | Hsieh et al. | |
| 7,343,226 B2 * | 3/2008 | Ehlers et al. | 700/276 |
| 7,346,404 B2 | 3/2008 | Eryurek et al. | |
| 7,346,433 B2 | 3/2008 | Budike, Jr. | |
| 7,346,835 B1 | 3/2008 | Lobinger et al. | |
| 7,349,761 B1 | 3/2008 | Cruse | |
| 7,354,005 B2 | 4/2008 | Carey et al. | |
| 7,356,050 B2 | 4/2008 | Reindl et al. | |
| 7,359,335 B2 | 4/2008 | Knop et al. | |
| 7,359,345 B2 | 4/2008 | Chang et al. | |
| 7,360,002 B2 | 4/2008 | Brueckner et al. | |
| 7,360,370 B2 | 4/2008 | Shah et al. | |
| 7,360,717 B2 | 4/2008 | Shah | |
| 7,364,093 B2 | 4/2008 | Garozzo | |
| 7,365,812 B2 | 4/2008 | Lee | |
| 7,366,498 B2 | 4/2008 | Ko et al. | |
| 7,366,944 B2 | 4/2008 | Oshins et al. | |
| 7,370,074 B2 | 5/2008 | Alexander et al. | |
| 7,377,450 B2 | 5/2008 | Van Ostrand et al. | |
| 7,379,791 B2 | 5/2008 | Tamarkin et al. | |
| 7,379,997 B2 | 5/2008 | Ehlers et al. | |
| 7,383,158 B2 | 6/2008 | Krocker et al. | |
| 7,389,150 B2 | 6/2008 | Inoue et al. | |
| 7,389,204 B2 | 6/2008 | Eryurek et al. | |
| RE40,437 E | 7/2008 | Rosen et al. | |
| 7,392,661 B2 | 7/2008 | Alles | |
| 7,395,122 B2 | 7/2008 | Kreidler et al. | |
| 7,395,137 B2 | 7/2008 | Robinson | |
| 7,403,128 B2 | 7/2008 | Scuka et al. | |
| 7,412,839 B2 | 8/2008 | Jayanth | |
| 7,412,842 B2 | 8/2008 | Pham | |
| 7,418,428 B2 | 8/2008 | Ehlers et al. | |
| 7,424,345 B2 | 9/2008 | Norbeck | |
| D578,026 S | 10/2008 | Roher et al. | |
| 7,433,740 B2 | 10/2008 | Hesse et al. | |
| 7,434,744 B2 | 10/2008 | Garozzo et al. | |
| 7,436,292 B2 | 10/2008 | Rourke et al. | |
| 7,436,293 B2 | 10/2008 | Rourke et al. | |
| 7,436,296 B2 | 10/2008 | Rourke et al. | |
| 7,436,400 B2 | 10/2008 | Cheng | |
| 7,437,198 B2 | 10/2008 | Iwaki | |
| 7,439,862 B2 * | 10/2008 | Quan | 340/572.7 |
| 7,441,094 B2 | 10/2008 | Stephens | |
| 7,446,660 B2 * | 11/2008 | Posamentier | 340/572.1 |
| 7,448,435 B2 | 11/2008 | Garozzo | |
| 7,451,937 B2 | 11/2008 | Flood et al. | |
| 7,454,269 B1 | 11/2008 | Dushane et al. | |
| 7,455,240 B2 | 11/2008 | Chapman, Jr. et al. | |
| 7,457,853 B1 | 11/2008 | Chari et al. | |
| 7,460,933 B2 | 12/2008 | Chapman, Jr. et al. | |
| 7,476,988 B2 | 1/2009 | Mulhouse et al. | |
| 7,516,106 B2 | 4/2009 | Ehlers et al. | |
| 7,526,364 B2 | 4/2009 | Rule et al. | |
| 7,567,523 B2 | 7/2009 | Black et al. | |
| 7,567,844 B2 | 7/2009 | Thomas et al. | |
| 7,571,195 B2 | 8/2009 | Billingsley et al. | |
| 7,571,355 B2 | 8/2009 | Shabalin | |
| 7,574,871 B2 * | 8/2009 | Bloemer et al. | 62/176.6 |
| 7,584,897 B2 | 9/2009 | Schultz et al. | |
| 7,587,459 B2 | 9/2009 | Wewalaarachchi | |
| 7,593,124 B1 | 9/2009 | Sheng et al. | |
| 7,593,787 B2 | 9/2009 | Feingold et al. | |
| 7,604,046 B2 | 10/2009 | Bergman et al. | |
| 7,624,931 B2 | 12/2009 | Chapman et al. | |
| 7,641,126 B2 | 1/2010 | Schultz et al. | |
| 7,650,323 B2 | 1/2010 | Hesse et al. | |
| D610,475 S | 2/2010 | Beers et al. | |
| 7,693,583 B2 | 4/2010 | Wolff et al. | |
| 7,693,591 B2 | 4/2010 | Hoglund et al. | |
| 7,706,923 B2 | 4/2010 | Amundson et al. | |
| 7,730,223 B1 * | 6/2010 | Bavor et al. | 710/8 |
| 7,734,572 B2 | 6/2010 | Wiemeyer et al. | |
| 7,743,124 B2 | 6/2010 | Holdaway et al. | |
| 7,747,757 B2 | 6/2010 | Garglulo et al. | |
| 7,752,289 B2 | 7/2010 | Kikkawa et al. | |
| 7,761,563 B2 | 7/2010 | Shike et al. | |
| 7,774,102 B2 | 8/2010 | Butler et al. | |
| 7,797,349 B2 | 9/2010 | Kosaka | |
| 7,809,472 B1 | 10/2010 | Silva et al. | |
| 7,827,963 B2 | 11/2010 | Li et al. | |
| 7,847,790 B2 | 12/2010 | Bewley et al. | |
| 7,861,941 B2 | 1/2011 | Schultz et al. | |
| 7,870,080 B2 | 1/2011 | Budike, Jr. | |
| 7,886,166 B2 * | 2/2011 | Shnekendorf et al. | 713/310 |
| 7,898,147 B2 | 3/2011 | Grabinger et al. | |
| 7,904,209 B2 | 3/2011 | Podgorny et al. | |
| 7,934,504 B2 | 5/2011 | Lowe et al. | |
| 7,949,615 B2 | 5/2011 | Ehlers et al. | |
| 7,963,454 B2 | 6/2011 | Sullivan et al. | |
| D642,081 S | 7/2011 | Kashimoto | |
| 7,979,164 B2 | 7/2011 | Garozzo et al. | |
| 8,005,576 B2 | 8/2011 | Rodgers | |
| 8,024,054 B2 | 9/2011 | Mairs et al. | |
| 8,032,254 B2 | 10/2011 | Amundson et al. | |
| 8,042,049 B2 | 10/2011 | Killian et al. | |
| D648,641 S | 11/2011 | Wallaert | |
| D648,642 S | 11/2011 | Wallaert | |

(56) References Cited

U.S. PATENT DOCUMENTS

| | | | |
|---|---|---|---|
| 8,050,801 B2 | 11/2011 | Richards et al. | |
| 8,082,068 B2 | 12/2011 | Rodgers | |
| 8,083,154 B2 | 12/2011 | Schultz et al. | |
| 8,087,593 B2 | 1/2012 | Leen | |
| 8,091,796 B2 | 1/2012 | Amundson et al. | |
| 8,099,178 B2 | 1/2012 | Mairs et al. | |
| 8,103,390 B2 | 1/2012 | Rodgers | |
| 8,112,181 B2 | 2/2012 | Remsburg | |
| 8,116,917 B2 | 2/2012 | Rodgers | |
| 8,122,110 B1 | 2/2012 | Wilbur et al. | |
| 8,127,060 B2 | 2/2012 | Doll et al. | |
| 8,167,216 B2 | 5/2012 | Schultz et al. | |
| 8,183,995 B2 | 5/2012 | Wang et al. | |
| 8,219,249 B2 * | 7/2012 | Harrod et al. | 700/276 |
| 8,224,491 B2 | 7/2012 | Koster et al. | |
| 8,239,066 B2 | 8/2012 | Jennings et al. | |
| 8,239,073 B2 * | 8/2012 | Fausak et al. | 700/295 |
| 8,244,383 B2 * | 8/2012 | Bergman et al. | 700/17 |
| 8,255,086 B2 | 8/2012 | Grohman | |
| 8,255,090 B2 | 8/2012 | Frader-Thompson | |
| 8,352,081 B2 | 1/2013 | Grohman | |
| 8,437,877 B2 | 5/2013 | Grohman | |
| 8,452,906 B2 | 5/2013 | Grohman | |
| 8,463,442 B2 | 6/2013 | Curry et al. | |
| 8,463,443 B2 | 6/2013 | Grohman et al. | |
| 8,548,630 B2 | 10/2013 | Grohman | |
| 8,564,400 B2 | 10/2013 | Grohman | |
| 2001/0025349 A1 | 9/2001 | Sharood et al. | |
| 2001/0034586 A1 | 10/2001 | Ewert et al. | |
| 2001/0048376 A1 | 12/2001 | Maeda et al. | |
| 2001/0055311 A1 | 12/2001 | Trachewsky et al. | |
| 2002/0002425 A1 | 1/2002 | Dossey et al. | |
| 2002/0013897 A1 | 1/2002 | McTernan et al. | |
| 2002/0016639 A1 | 2/2002 | Smith et al. | |
| 2002/0022894 A1 | 2/2002 | Eryurek et al. | |
| 2002/0026476 A1 | 2/2002 | Miyazaki et al. | |
| 2002/0033252 A1 | 3/2002 | Sasao et al. | |
| 2002/0048194 A1 | 4/2002 | Klein | |
| 2002/0053047 A1 | 5/2002 | Gold | |
| 2002/0072814 A1 | 6/2002 | Schuler et al. | |
| 2002/0091784 A1 | 7/2002 | Baker et al. | |
| 2002/0104323 A1 | 8/2002 | Rash et al. | |
| 2002/0116550 A1 | 8/2002 | Hansen | |
| 2002/0123896 A1 | 9/2002 | Diez et al. | |
| 2002/0124211 A1 | 9/2002 | Gray et al. | |
| 2002/0143523 A1 | 10/2002 | Balaji et al. | |
| 2002/0152298 A1 | 10/2002 | Kikta et al. | |
| 2002/0157054 A1 | 10/2002 | Shin et al. | |
| 2002/0163427 A1 | 11/2002 | Eryurek et al. | |
| 2002/0178288 A1 | 11/2002 | McLeod | |
| 2002/0190242 A1 | 12/2002 | Iillie et al. | |
| 2002/0191026 A1 | 12/2002 | Rodden et al. | |
| 2002/0191603 A1 | 12/2002 | Shin et al. | |
| 2002/0198990 A1 | 12/2002 | Bradfield et al. | |
| 2003/0058863 A1 | 3/2003 | Oost | |
| 2003/0061340 A1 | 3/2003 | Sun et al. | |
| 2003/0078677 A1 | 4/2003 | Hull et al. | |
| 2003/0088338 A1 | 5/2003 | Phillips et al. | |
| 2003/0097482 A1 | 5/2003 | DeHart et al. | |
| 2003/0108064 A1 | 6/2003 | Bilke et al. | |
| 2003/0109963 A1 | 6/2003 | Oppedisano et al. | |
| 2003/0115177 A1 | 6/2003 | Takanabe et al. | |
| 2003/0116637 A1 | 6/2003 | Ellingham | |
| 2003/0154355 A1 | 8/2003 | Fernandez | |
| 2003/0179721 A1 | 9/2003 | Shurmantine et al. | |
| 2003/0191857 A1 | 10/2003 | Terrell et al. | |
| 2003/0206100 A1 | 11/2003 | Richman et al. | |
| 2003/0229784 A1 | 12/2003 | Cuellar et al. | |
| 2004/0001478 A1 | 1/2004 | Wong | |
| 2004/0003051 A1 | 1/2004 | Krzyzanowski et al. | |
| 2004/0003415 A1 | 1/2004 | Ng | |
| 2004/0024483 A1 | 2/2004 | Holcombe | |
| 2004/0025089 A1 | 2/2004 | Haswarey et al. | |
| 2004/0039478 A1 | 2/2004 | Kiesel et al. | |
| 2004/0059815 A1 | 3/2004 | Buckingham et al. | |
| 2004/0066788 A1 | 4/2004 | Lin et al. | |
| 2004/0088069 A1 | 5/2004 | Singh | |
| 2004/0095237 A1 | 5/2004 | Chen et al. | |
| 2004/0104942 A1 | 6/2004 | Weigel | |
| 2004/0107717 A1 | 6/2004 | Yoon et al. | |
| 2004/0111186 A1 | 6/2004 | Rossi et al. | |
| 2004/0111254 A1 | 6/2004 | Gogel et al. | |
| 2004/0117330 A1 | 6/2004 | Ehlers et al. | |
| 2004/0133314 A1 | 7/2004 | Ehlers et al. | |
| 2004/0133704 A1 | 7/2004 | Krzyzanowski | |
| 2004/0138981 A1 | 7/2004 | Ehlers et al. | |
| 2004/0139038 A1 | 7/2004 | Ehlers et al. | |
| 2004/0143360 A1 | 7/2004 | Kiesel et al. | |
| 2004/0146008 A1 | 7/2004 | Conradt et al. | |
| 2004/0148482 A1 | 7/2004 | Grundy et al. | |
| 2004/0156360 A1 | 8/2004 | Sexton et al. | |
| 2004/0159112 A1 | 8/2004 | Jayanth et al. | |
| 2004/0189590 A1 | 9/2004 | Mehaffey et al. | |
| 2004/0204775 A1 | 10/2004 | Keyes et al. | |
| 2004/0205781 A1 | 10/2004 | Hill et al. | |
| 2004/0206096 A1 | 10/2004 | Jayanth | |
| 2004/0210348 A1 | 10/2004 | Imhof et al. | |
| 2004/0218591 A1 | 11/2004 | Ogawa et al. | |
| 2004/0222307 A1 | 11/2004 | DeLuca | |
| 2004/0236471 A1 | 11/2004 | Poth | |
| 2004/0245352 A1 | 12/2004 | Smith et al. | |
| 2004/0260427 A1 | 12/2004 | Wimsatt | |
| 2004/0260812 A1 | 12/2004 | Rhodes et al. | |
| 2004/0260927 A1 | 12/2004 | Grobman | |
| 2004/0266491 A1 | 12/2004 | Howard et al. | |
| 2004/0267385 A1 | 12/2004 | Lingemann | |
| 2004/0267395 A1 | 12/2004 | Discenzo et al. | |
| 2004/0267790 A1 | 12/2004 | Pak et al. | |
| 2005/0005249 A1 | 1/2005 | Hill et al. | |
| 2005/0007249 A1 | 1/2005 | Eryurek et al. | |
| 2005/0010759 A1 | 1/2005 | Wakiyama | |
| 2005/0033707 A1 | 2/2005 | Ehlers et al. | |
| 2005/0034023 A1 | 2/2005 | Maturana et al. | |
| 2005/0040247 A1 | 2/2005 | Pouchak | |
| 2005/0040250 A1 | 2/2005 | Wruck | |
| 2005/0041033 A1 | 2/2005 | Hilts et al. | |
| 2005/0041633 A1 | 2/2005 | Roeser et al. | |
| 2005/0046584 A1 | 3/2005 | Breed | |
| 2005/0051168 A1 | 3/2005 | DeVries et al. | |
| 2005/0054381 A1 | 3/2005 | Lee et al. | |
| 2005/0055427 A1 | 3/2005 | Frutiger et al. | |
| 2005/0068978 A1 | 3/2005 | Sexton et al. | |
| 2005/0073789 A1 | 4/2005 | Tanis | |
| 2005/0076150 A1 | 4/2005 | Lee et al. | |
| 2005/0080879 A1 | 4/2005 | Kim et al. | |
| 2005/0081156 A1 | 4/2005 | Clark et al. | |
| 2005/0081157 A1 | 4/2005 | Clark et al. | |
| 2005/0090915 A1 | 4/2005 | Gelwitz | |
| 2005/0096872 A1 | 5/2005 | Blevins et al. | |
| 2005/0097478 A1 | 5/2005 | Killian et al. | |
| 2005/0103874 A1 | 5/2005 | Erdman | |
| 2005/0109048 A1 | 5/2005 | Lee | |
| 2005/0115254 A1 * | 6/2005 | Knight et al. | 62/176.1 |
| 2005/0116023 A1 | 6/2005 | Amundson et al. | |
| 2005/0118996 A1 | 6/2005 | Lee et al. | |
| 2005/0119765 A1 | 6/2005 | Bergman | |
| 2005/0119766 A1 | 6/2005 | Amundson et al. | |
| 2005/0119771 A1 | 6/2005 | Amundson et al. | |
| 2005/0119793 A1 | 6/2005 | Amundson et al. | |
| 2005/0119794 A1 | 6/2005 | Amundson et al. | |
| 2005/0120012 A1 | 6/2005 | Poth et al. | |
| 2005/0125495 A1 | 6/2005 | Tjong et al. | |
| 2005/0143138 A1 | 6/2005 | Lee et al. | |
| 2005/0145705 A1 | 7/2005 | Shah et al. | |
| 2005/0150967 A1 | 7/2005 | Chapman, Jr. et al. | |
| 2005/0154494 A1 | 7/2005 | Ahmed | |
| 2005/0159848 A1 | 7/2005 | Shah et al. | |
| 2005/0159924 A1 | 7/2005 | Shah et al. | |
| 2005/0161517 A1 | 7/2005 | Helt et al. | |
| 2005/0166610 A1 | 8/2005 | Jayanth | |
| 2005/0176410 A1 | 8/2005 | Brooking et al. | |
| 2005/0182498 A1 | 8/2005 | Landou et al. | |
| 2005/0192727 A1 | 9/2005 | Shostak et al. | |
| 2005/0193155 A1 | 9/2005 | Fujita | |

(56) References Cited

U.S. PATENT DOCUMENTS

| | | |
|---|---|---|
| 2005/0198040 A1 | 9/2005 | Cohen et al. |
| 2005/0223339 A1 | 10/2005 | Lee |
| 2005/0229610 A1 | 10/2005 | Park et al. |
| 2005/0235661 A1 | 10/2005 | Pham |
| 2005/0235662 A1 | 10/2005 | Pham |
| 2005/0235663 A1 | 10/2005 | Pham |
| 2005/0235666 A1* | 10/2005 | Springer et al. ............... 62/186 |
| 2005/0240312 A1 | 10/2005 | Terry et al. |
| 2005/0252673 A1 | 11/2005 | Kregle et al. |
| 2005/0256591 A1 | 11/2005 | Rule et al. |
| 2005/0256935 A1 | 11/2005 | Overstreet et al. |
| 2005/0258257 A1 | 11/2005 | Thurman, Jr. et al. |
| 2005/0258259 A1 | 11/2005 | Stanimirovic |
| 2005/0270151 A1 | 12/2005 | Winick |
| 2005/0278071 A1 | 12/2005 | Durham |
| 2005/0280364 A1 | 12/2005 | Omura et al. |
| 2005/0281368 A1 | 12/2005 | Droba et al. |
| 2005/0288823 A1 | 12/2005 | Hesse et al. |
| 2006/0006244 A1 | 1/2006 | Morrow et al. |
| 2006/0009861 A1 | 1/2006 | Bonasla |
| 2006/0009863 A1 | 1/2006 | Lingemann |
| 2006/0021358 A1 | 2/2006 | Nallapa |
| 2006/0021359 A1 | 2/2006 | Hur et al. |
| 2006/0027671 A1 | 2/2006 | Shah |
| 2006/0030954 A1 | 2/2006 | Bergman et al. |
| 2006/0036350 A1 | 2/2006 | Bohrer et al. |
| 2006/0036952 A1 | 2/2006 | Yang |
| 2006/0041898 A1 | 2/2006 | Potyrailo et al. |
| 2006/0045107 A1 | 3/2006 | Kucenas et al. |
| 2006/0048064 A1 | 3/2006 | Vronay |
| 2006/0058924 A1 | 3/2006 | Shah |
| 2006/0063523 A1 | 3/2006 | McFarland et al. |
| 2006/0090142 A1 | 4/2006 | Glasgow et al. |
| 2006/0090483 A1 | 5/2006 | Kim et al. |
| 2006/0091227 A1 | 5/2006 | Attridge, Jr. |
| 2006/0092977 A1 | 5/2006 | Bai et al. |
| 2006/0105697 A1 | 5/2006 | Aronstam et al. |
| 2006/0106791 A1 | 5/2006 | Morrow et al. |
| 2006/0108432 A1 | 5/2006 | Mattheis |
| 2006/0111816 A1 | 5/2006 | Spalink et al. |
| 2006/0130497 A1 | 6/2006 | Kang et al. |
| 2006/0144055 A1 | 7/2006 | Ahn |
| 2006/0144232 A1 | 7/2006 | Kang et al. |
| 2006/0149414 A1 | 7/2006 | Archacki, Jr. et al. |
| 2006/0150027 A1 | 7/2006 | Paden |
| 2006/0153247 A1 | 7/2006 | Stumer |
| 2006/0155398 A1 | 7/2006 | Hoffberg et al. |
| 2006/0158051 A1 | 7/2006 | Bartlett et al. |
| 2006/0159007 A1 | 7/2006 | Frutiger et al. |
| 2006/0168522 A1 | 7/2006 | Bala |
| 2006/0185818 A1 | 8/2006 | Garozzo |
| 2006/0186214 A1 | 8/2006 | Simon et al. |
| 2006/0190138 A1 | 8/2006 | Stone et al. |
| 2006/0192021 A1 | 8/2006 | Schultz et al. |
| 2006/0192022 A1 | 8/2006 | Barton et al. |
| 2006/0196953 A1 | 9/2006 | Simon et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0202978 A1 | 9/2006 | Lee et al. |
| 2006/0206220 A1 | 9/2006 | Amundson |
| 2006/0209208 A1 | 9/2006 | Kim et al. |
| 2006/0212194 A1 | 9/2006 | Breed |
| 2006/0219799 A1 | 10/2006 | Schultz et al. |
| 2006/0229090 A1 | 10/2006 | LaDue |
| 2006/0235548 A1 | 10/2006 | Gaudette |
| 2006/0236351 A1 | 10/2006 | Ellerbrock et al. |
| 2006/0239296 A1 | 10/2006 | Jinzaki et al. |
| 2006/0248233 A1 | 11/2006 | Park et al. |
| 2006/0250578 A1 | 11/2006 | Pohl et al. |
| 2006/0250979 A1 | 11/2006 | Gauweller et al. |
| 2006/0267756 A1 | 11/2006 | Kates |
| 2006/0276917 A1 | 12/2006 | Li et al. |
| 2007/0005191 A1 | 1/2007 | Sloup et al. |
| 2007/0008116 A1 | 1/2007 | Bergman et al. |
| 2007/0012052 A1* | 1/2007 | Butler et al. ............... 62/181 |
| 2007/0013534 A1 | 1/2007 | DiMaggio |
| 2007/0014233 A1 | 1/2007 | Oguro et al. |
| 2007/0016311 A1 | 1/2007 | Bergman et al. |
| 2007/0016476 A1 | 1/2007 | Hoffberg et al. |
| 2007/0019683 A1 | 1/2007 | Kryzyanowski |
| 2007/0025368 A1 | 2/2007 | Ha et al. |
| 2007/0032909 A1 | 2/2007 | Tolbert, Jr. et al. |
| 2007/0033310 A1 | 2/2007 | Kweon |
| 2007/0035255 A1 | 2/2007 | Shuster et al. |
| 2007/0040040 A1 | 2/2007 | Mueller |
| 2007/0043477 A1 | 2/2007 | Ehlers et al. |
| 2007/0043478 A1 | 2/2007 | Ehlers et al. |
| 2007/0045429 A1 | 3/2007 | Chapman, Jr. et al. |
| 2007/0045431 A1 | 3/2007 | Chapman, Jr. et al. |
| 2007/0045442 A1 | 3/2007 | Chapman, Jr. et al. |
| 2007/0051818 A1 | 3/2007 | Atlas |
| 2007/0053513 A1 | 3/2007 | Hoffberg |
| 2007/0055407 A1 | 3/2007 | Goldberg et al. |
| 2007/0055757 A1 | 3/2007 | Mairs et al. |
| 2007/0067062 A1 | 3/2007 | Mairs et al. |
| 2007/0067496 A1 | 3/2007 | Deiretsbacher et al. |
| 2007/0073973 A1 | 3/2007 | Hazay |
| 2007/0080235 A1 | 4/2007 | Fulton, Jr. |
| 2007/0083721 A1 | 4/2007 | Grinspan |
| 2007/0084937 A1 | 4/2007 | Ahmed |
| 2007/0088883 A1 | 4/2007 | Wakabayashi |
| 2007/0089090 A1 | 4/2007 | Riedl et al. |
| 2007/0090199 A1 | 4/2007 | Hull et al. |
| 2007/0093226 A1 | 4/2007 | Foltyn et al. |
| 2007/0097993 A1 | 5/2007 | Bojahra et al. |
| 2007/0102149 A1 | 5/2007 | Kates |
| 2007/0109114 A1 | 5/2007 | Farley et al. |
| 2007/0109975 A1 | 5/2007 | Reckamp et al. |
| 2007/0113247 A1 | 5/2007 | Kwak |
| 2007/0114291 A1 | 5/2007 | Pouchak |
| 2007/0119957 A1 | 5/2007 | Kates |
| 2007/0119958 A1 | 5/2007 | Kates |
| 2007/0129820 A1 | 6/2007 | Glanzer et al. |
| 2007/0129825 A1 | 6/2007 | Kargenian |
| 2007/0129826 A1 | 6/2007 | Kreidler et al. |
| 2007/0129917 A1 | 6/2007 | Blevins et al. |
| 2007/0130834 A1 | 6/2007 | Kande et al. |
| 2007/0130969 A1 | 6/2007 | Peterson et al. |
| 2007/0131784 A1 | 6/2007 | Garozzo et al. |
| 2007/0135692 A1 | 6/2007 | Hwang et al. |
| 2007/0135946 A1 | 6/2007 | Sugiyama et al. |
| 2007/0136669 A1 | 6/2007 | Kwon et al. |
| 2007/0136687 A1 | 6/2007 | Pak |
| 2007/0138307 A1 | 6/2007 | Khoo |
| 2007/0138308 A1 | 6/2007 | Schultz et al. |
| 2007/0143704 A1 | 6/2007 | Laird-McConnell |
| 2007/0143707 A1 | 6/2007 | Yun et al. |
| 2007/0157016 A1 | 7/2007 | Dayan et al. |
| 2007/0158442 A1 | 7/2007 | Chapman, Jr. et al. |
| 2007/0168887 A1 | 7/2007 | Lee |
| 2007/0177505 A1 | 8/2007 | Charrua et al. |
| 2007/0191024 A1 | 8/2007 | Kim et al. |
| 2007/0192731 A1 | 8/2007 | Townsend et al. |
| 2007/0194138 A9 | 8/2007 | Shah |
| 2007/0204637 A1 | 9/2007 | Fujii et al. |
| 2007/0205297 A1 | 9/2007 | Finkam et al. |
| 2007/0205916 A1* | 9/2007 | Blom et al. ............... 340/870.17 |
| 2007/0208461 A1 | 9/2007 | Chase |
| 2007/0208549 A1 | 9/2007 | Blevins et al. |
| 2007/0213853 A1 | 9/2007 | Glanzer et al. |
| 2007/0219645 A1 | 9/2007 | Thomas et al. |
| 2007/0220301 A1 | 9/2007 | Brundridge et al. |
| 2007/0220907 A1 | 9/2007 | Ehlers |
| 2007/0221741 A1 | 9/2007 | Wagner et al. |
| 2007/0223500 A1 | 9/2007 | Lee et al. |
| 2007/0225868 A1 | 9/2007 | Terlson et al. |
| 2007/0225869 A1 | 9/2007 | Amundson et al. |
| 2007/0233323 A1 | 10/2007 | Wiemeyer et al. |
| 2007/0236156 A1 | 10/2007 | Lys et al. |
| 2007/0237032 A1 | 10/2007 | Rhee et al. |
| 2007/0238413 A1 | 10/2007 | Coutts |
| 2007/0239658 A1 | 10/2007 | Cunningham et al. |

(56) References Cited

U.S. PATENT DOCUMENTS

| | | |
|---|---|---|
| 2007/0240226 A1 | 10/2007 | Song et al. |
| 2007/0241203 A1 | 10/2007 | Wagner et al. |
| 2007/0242058 A1 | 10/2007 | Yamada |
| 2007/0245306 A1 | 10/2007 | Dameshek et al. |
| 2007/0257120 A1 | 11/2007 | Chapman, Jr. et al. |
| 2007/0257121 A1* | 11/2007 | Chapman et al. ........... 236/44 C |
| 2007/0260782 A1 | 11/2007 | Shaikli |
| 2007/0260978 A1 | 11/2007 | Oh et al. |
| 2007/0266329 A1 | 11/2007 | Gaudette |
| 2007/0268667 A1 | 11/2007 | Moorer et al. |
| 2007/0271521 A1 | 11/2007 | Harriger et al. |
| 2007/0274093 A1 | 11/2007 | Haim et al. |
| 2007/0277013 A1 | 11/2007 | Rexha et al. |
| 2007/0278320 A1 | 12/2007 | Lunacek et al. |
| 2007/0284452 A1 | 12/2007 | Butler et al. |
| 2007/0299857 A1 | 12/2007 | Gwozdz et al. |
| 2007/0300064 A1 | 12/2007 | Isaacs et al. |
| 2008/0003845 A1 | 1/2008 | Hong et al. |
| 2008/0004727 A1 | 1/2008 | Glanzer et al. |
| 2008/0005428 A1 | 1/2008 | Maul et al. |
| 2008/0006709 A1 | 1/2008 | Ashworth et al. |
| 2008/0012437 A1* | 1/2008 | Kabata et al. ................... 310/54 |
| 2008/0013259 A1 | 1/2008 | Barton et al. |
| 2008/0029610 A1 | 2/2008 | Nichols |
| 2008/0031147 A1 | 2/2008 | Fieremans et al. |
| 2008/0040351 A1 | 2/2008 | Jin et al. |
| 2008/0048045 A1 | 2/2008 | Butler et al. |
| 2008/0048046 A1 | 2/2008 | Wagner et al. |
| 2008/0054082 A1 | 3/2008 | Evans et al. |
| 2008/0055190 A1 | 3/2008 | Lee |
| 2008/0056722 A1 | 3/2008 | Hendrix et al. |
| 2008/0057872 A1 | 3/2008 | McFarland et al. |
| 2008/0057931 A1 | 3/2008 | Nass et al. |
| 2008/0058996 A1 | 3/2008 | Sachdev et al. |
| 2008/0059682 A1 | 3/2008 | Cooley et al. |
| 2008/0062892 A1 | 3/2008 | Dodgen et al. |
| 2008/0063006 A1 | 3/2008 | Nichols |
| 2008/0065926 A1 | 3/2008 | Poth et al. |
| 2008/0072704 A1 | 3/2008 | Clark et al. |
| 2008/0073440 A1 | 3/2008 | Butler et al. |
| 2008/0077884 A1 | 3/2008 | Patitucci |
| 2008/0077886 A1 | 3/2008 | Eichner |
| 2008/0082767 A1 | 4/2008 | Nulkar et al. |
| 2008/0083009 A1 | 4/2008 | Kaler et al. |
| 2008/0083834 A1 | 4/2008 | Krebs et al. |
| 2008/0097651 A1 | 4/2008 | Shah et al. |
| 2008/0104189 A1 | 5/2008 | Baker et al. |
| 2008/0114500 A1 | 5/2008 | Hull et al. |
| 2008/0120335 A1 | 5/2008 | Dolgoff |
| 2008/0121729 A1 | 5/2008 | Gray |
| 2008/0128523 A1 | 6/2008 | Hoglund et al. |
| 2008/0129475 A1 | 6/2008 | Breed et al. |
| 2008/0133033 A1 | 6/2008 | Wolff et al. |
| 2008/0133060 A1 | 6/2008 | Hoglund et al. |
| 2008/0133061 A1 | 6/2008 | Hoglund et al. |
| 2008/0134087 A1 | 6/2008 | Hoglund et al. |
| 2008/0134098 A1 | 6/2008 | Hoglund et al. |
| 2008/0144302 A1 | 6/2008 | Rosenblatt |
| 2008/0148098 A1 | 6/2008 | Chen |
| 2008/0161976 A1 | 7/2008 | Stanimirovic |
| 2008/0161977 A1 | 7/2008 | Takach et al. |
| 2008/0161978 A1 | 7/2008 | Shah |
| 2008/0167931 A1 | 7/2008 | Gerstemeier et al. |
| 2008/0168255 A1 | 7/2008 | Abou-Emara et al. |
| 2008/0168356 A1 | 7/2008 | Eryurek et al. |
| 2008/0173035 A1* | 7/2008 | Thayer et al. ................... 62/173 |
| 2008/0183335 A1 | 7/2008 | Poth et al. |
| 2008/0184059 A1 | 7/2008 | Chen |
| 2008/0185976 A1 | 8/2008 | Dickey et al. |
| 2008/0186160 A1 | 8/2008 | Kim et al. |
| 2008/0192649 A1 | 8/2008 | Pyeon et al. |
| 2008/0192745 A1 | 8/2008 | Spears |
| 2008/0195254 A1 | 8/2008 | Jung et al. |
| 2008/0195581 A1 | 8/2008 | Ashmore et al. |
| 2008/0195687 A1 | 8/2008 | Jung et al. |
| 2008/0198036 A1 | 8/2008 | Songkakul et al. |
| 2008/0215987 A1 | 9/2008 | Alexander et al. |
| 2008/0216461 A1 | 9/2008 | Nakano et al. |
| 2008/0217418 A1 | 9/2008 | Helt et al. |
| 2008/0217419 A1 | 9/2008 | Ehlers et al. |
| 2008/0223944 A1 | 9/2008 | Helt et al. |
| 2008/0235611 A1 | 9/2008 | Fraley et al. |
| 2008/0256475 A1 | 10/2008 | Amundson et al. |
| 2008/0264085 A1 | 10/2008 | Perry et al. |
| 2008/0272934 A1 | 11/2008 | Wang et al. |
| 2008/0281472 A1* | 11/2008 | Podgorny et al. ............. 700/276 |
| 2008/0294274 A1 | 11/2008 | Laberge et al. |
| 2008/0294932 A1 | 11/2008 | Oshins et al. |
| 2009/0001180 A1 | 1/2009 | Siddaramanna et al. |
| 2009/0001182 A1 | 1/2009 | Siddaramanna et al. |
| 2009/0049847 A1 | 2/2009 | Butler et al. |
| 2009/0052105 A1* | 2/2009 | Soleimani et al. ............ 361/103 |
| 2009/0057424 A1 | 3/2009 | Sullivan et al. |
| 2009/0057425 A1 | 3/2009 | Sullivan et al. |
| 2009/0062964 A1 | 3/2009 | Sullivan et al. |
| 2009/0065597 A1 | 3/2009 | Garozzo et al. |
| 2009/0077423 A1 | 3/2009 | Kim et al. |
| 2009/0094506 A1 | 4/2009 | Lakkis |
| 2009/0105846 A1 | 4/2009 | Hesse et al. |
| 2009/0113037 A1 | 4/2009 | Pouchak |
| 2009/0119092 A1 | 5/2009 | Balasubramanyan |
| 2009/0132091 A1 | 5/2009 | Chambers et al. |
| 2009/0140056 A1 | 6/2009 | Leen |
| 2009/0140057 A1 | 6/2009 | Leen |
| 2009/0140058 A1 | 6/2009 | Koster et al. |
| 2009/0140061 A1 | 6/2009 | Schultz et al. |
| 2009/0140062 A1 | 6/2009 | Amundson et al. |
| 2009/0140063 A1 | 6/2009 | Koster et al. |
| 2009/0140064 A1 | 6/2009 | Schultz et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0195349 A1* | 8/2009 | Frader-Thompson et al. 340/3.1 |
| 2009/0198810 A1 | 8/2009 | Bayer et al. |
| 2009/0245278 A1 | 10/2009 | Kee |
| 2009/0257431 A1 | 10/2009 | Ramanathan et al. |
| 2009/0259785 A1 | 10/2009 | Perry et al. |
| 2009/0261174 A1 | 10/2009 | Butler et al. |
| 2009/0261767 A1 | 10/2009 | Butler et al. |
| 2009/0266904 A1 | 10/2009 | Cohen |
| 2009/0267540 A1 | 10/2009 | Chemel et al. |
| 2009/0271336 A1 | 10/2009 | Franks |
| 2009/0287736 A1 | 11/2009 | Shike et al. |
| 2010/0011437 A1 | 1/2010 | Courtney |
| 2010/0023865 A1 | 1/2010 | Fulker et al. |
| 2010/0050075 A1 | 2/2010 | Thorson et al. |
| 2010/0050108 A1 | 2/2010 | Mirza |
| 2010/0063644 A1 | 3/2010 | Kansal et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1 | 3/2010 | Harrod et al. |
| 2010/0073159 A1 | 3/2010 | Schmickley et al. |
| 2010/0076605 A1 | 3/2010 | Harrod et al. |
| 2010/0100253 A1 | 4/2010 | Fausak et al. |
| 2010/0101854 A1 | 4/2010 | Wallaert et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106305 A1* | 4/2010 | Pavlak et al. .................. 700/276 |
| 2010/0106307 A1 | 4/2010 | Grohman et al. |
| 2010/0106308 A1 | 4/2010 | Filbeck et al. |
| 2010/0106309 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106313 A1 | 4/2010 | Grohman et al. |
| 2010/0106314 A1 | 4/2010 | Grohman et al. |
| 2010/0106315 A1 | 4/2010 | Grohman |
| 2010/0106316 A1 | 4/2010 | Curry et al. |
| 2010/0106317 A1 | 4/2010 | Grohman et al. |
| 2010/0106318 A1 | 4/2010 | Grohman et al. |

(56) References Cited

U.S. PATENT DOCUMENTS

| | | |
|---|---|---|
| 2010/0106319 A1 | 4/2010 | Grohman et al. |
| 2010/0106320 A1 | 4/2010 | Grohman et al. |
| 2010/0106321 A1 | 4/2010 | Hadzidedic |
| 2010/0106322 A1 | 4/2010 | Grohman |
| 2010/0106323 A1 | 4/2010 | Wallaert |
| 2010/0106324 A1 | 4/2010 | Grohman |
| 2010/0106325 A1 | 4/2010 | Grohman |
| 2010/0106326 A1 | 4/2010 | Grohman |
| 2010/0106327 A1 | 4/2010 | Grohman et al. |
| 2010/0106329 A1 | 4/2010 | Grohman |
| 2010/0106330 A1 | 4/2010 | Grohman |
| 2010/0106333 A1 | 4/2010 | Grohman et al. |
| 2010/0106334 A1 | 4/2010 | Grohman et al. |
| 2010/0106787 A1 | 4/2010 | Grohman |
| 2010/0106809 A1 | 4/2010 | Grohman |
| 2010/0106810 A1 | 4/2010 | Grohman |
| 2010/0106814 A1 | 4/2010 | Hadzidedic et al. |
| 2010/0106815 A1 | 4/2010 | Grohman et al. |
| 2010/0106925 A1 | 4/2010 | Grohman et al. |
| 2010/0106957 A1 | 4/2010 | Grohman et al. |
| 2010/0107007 A1 | 4/2010 | Grohman et al. |
| 2010/0107070 A1 | 4/2010 | Devineni et al. |
| 2010/0107071 A1 | 4/2010 | Pavlak et al. |
| 2010/0107072 A1 | 4/2010 | Mirza et al. |
| 2010/0107073 A1 | 4/2010 | Wallaert |
| 2010/0107074 A1 | 4/2010 | Pavlak et al. |
| 2010/0107076 A1 | 4/2010 | Grohman |
| 2010/0107083 A1 | 4/2010 | Grohman |
| 2010/0107103 A1 | 4/2010 | Wallaert |
| 2010/0107109 A1 | 4/2010 | Filbeck et al. |
| 2010/0107110 A1 | 4/2010 | Mirza |
| 2010/0107111 A1 | 4/2010 | Mirza |
| 2010/0107112 A1 | 4/2010 | Jennings et al. |
| 2010/0107232 A1 | 4/2010 | Grohman et al. |
| 2010/0115364 A1 | 5/2010 | Grohman |
| 2010/0131884 A1 | 5/2010 | Shah |
| 2010/0142526 A1 | 6/2010 | Wong |
| 2010/0145528 A1 | 6/2010 | Bergman et al. |
| 2010/0145629 A1 | 6/2010 | Botich et al. |
| 2010/0168924 A1 | 7/2010 | Tessier et al. |
| 2010/0169419 A1 | 7/2010 | DeVilbiss et al. |
| 2010/0179696 A1 | 7/2010 | Grohman et al. |
| 2010/0211546 A1 | 8/2010 | Grohman et al. |
| 2010/0241245 A1 | 9/2010 | Wiemeyer et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0272102 A1 | 10/2010 | Kobayashi |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301772 A1 | 12/2010 | Hahnlen et al. |
| 2010/0301773 A1 | 12/2010 | Chemel et al. |
| 2010/0301774 A1 | 12/2010 | Chemel et al. |
| 2010/0305761 A1 | 12/2010 | Remsburg |
| 2010/0314458 A1 | 12/2010 | Votaw et al. |
| 2010/0319362 A1 | 12/2010 | Hisaoka |
| 2011/0001436 A1 | 1/2011 | Chemel et al. |
| 2011/0001438 A1 | 1/2011 | Chemel et al. |
| 2011/0004823 A1 | 1/2011 | Wallaert |
| 2011/0004824 A1 | 1/2011 | Thorson et al. |
| 2011/0007016 A1 | 1/2011 | Mirza et al. |
| 2011/0007017 A1 | 1/2011 | Wallaert |
| 2011/0010620 A1 | 1/2011 | Mirza et al. |
| 2011/0010621 A1 | 1/2011 | Wallaert |
| 2011/0010652 A1 | 1/2011 | Wallaert |
| 2011/0010653 A1 | 1/2011 | Wallaert |
| 2011/0010660 A1 | 1/2011 | Thorson et al. |
| 2011/0032932 A2 | 2/2011 | Pyeon et al. |
| 2011/0040785 A1 | 2/2011 | Steenberg et al. |
| 2011/0061014 A1 | 3/2011 | Frader-Thompson et al. |
| 2011/0063126 A1 | 3/2011 | Kennedy et al. |
| 2011/0066297 A1 | 3/2011 | Saberi et al. |
| 2011/0137467 A1 | 6/2011 | Leen et al. |
| 2011/0160915 A1 | 6/2011 | Bergman et al. |
| 2011/0251726 A1 | 10/2011 | McNulty et al. |
| 2012/0012662 A1 | 1/2012 | Leen et al. |
| 2012/0046792 A1 | 2/2012 | Secor |
| 2012/0065805 A1 | 3/2012 | Montalvo |
| 2012/0116593 A1 | 5/2012 | Amundson et al. |
| 2012/0181010 A1 | 7/2012 | Schultz et al. |

FOREIGN PATENT DOCUMENTS

| | | |
|---|---|---|
| EP | 2241836 A1 | 10/2010 |
| EP | 2241837 A1 | 10/2010 |
| GB | 2117573 A | 10/1983 |
| WO | 02056540 A2 | 7/2002 |
| WO | 2008100641 A1 | 8/2008 |

OTHER PUBLICATIONS

Related case U.S. Appl. No. 12/603,450, filed Oct. 21, 2009 to Wojciech Grohman, entitled "Alarm and Diagnostics System and Method for a Distributed-Architecture Heating, Ventilation and Air Conditioning Network".

Related case U.S. Appl. No. 12/603,382, filed Oct. 21, 2009 to Wojciech Grohman, entitled "Device Abstraction System and Method for a Distributed-Architecture Heating, Ventilation and Air Conditioning System".

Related case U.S. Appl. No. 12/603,504, filed Oct. 21, 2009 to Amanda Filbeck et al., entitled "System and Method of Use for a User Interface Dashboard of a Heating, Ventilation and Air Conditioning Network".

Related case U.S. Appl. No. 12/603,449, filed Oct. 21, 2009 to Wojciech Grohman et al., entitled "System and Method of Use for a User Interface Dashboard of a Heating, Ventilation and Air Conditioning Network".

Related case U.S. Appl. No. 12/603,460, filed Oct. 21, 2009 to Wojciech Grohman et al., entitled "System and Method of Use for a User Interface Dashboard of a Heating, Ventilation and Air Conditioning Network".

Related case U.S. Appl. No. 12/603,526, filed Oct. 21, 2009 to Wojciech Grohman et al., entitled "Communication Protocol System and Methof for a Distributed-Architecture Heating, Ventilation and Air Conditioning Network K".

Related case U.S. Appl. No. 12/603,532, filed Oct. 21, 2009 to Wojciech Grohman, entitled "Communication Protocol System and Method for a Distributed-Architecture Heating, Ventilation and Air Conditioning Network".

Related case U.S. Appl. No. 12/603,475, filed Oct. 21, 2009 to Suresh Kumar Devineni et al., entitled "System and Method of Use for a User Interface Dashboard of a Heating, Ventilation and Air Conditioning Network".

Related case U.S. Appl. No. 12/603,362, filed Oct. 21, 2009 to Wojciech Grohman et al., entitled "Architecture Heating, Ventilation and Air Conditioning System".

Related case U.S. Appl. No. 12/603,473, filed Oct. 21, 2009 to Wojciech Grohman et al., entitled "System and Method for Zoning a Distributed-Architecture Heating, Ventilation and Air Conditioning Network".

Related case U.S. Appl. No. 12/603,407, filed Oct. 21, 2009 to Amanda Filbeck et al., entitled "System and Method for Zoning a Distributed-Architecture Heating, Ventilation and Air Conditioning Network".

Related case U.S. Appl. No. 12/603,496, filed Oct. 21, 2009 to Wojciech Grohman et al., entitled "Device Abstraction System and Method for a Distributed-Architecture Heating, Ventilation and Air Conditioning System".

Related case U.S. Appl. No. 12/603,482, filed Oct. 21, 2009 to Muhammad Mirza et al., entitled "System and Method of Use for a User Interface Dashboard of a Heating, Ventilation and Air Conditioning Network".

(56) References Cited

OTHER PUBLICATIONS

Related case U.S. Appl. No. 12/603,488, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,495, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,497, filed Oct. 21, 2009 to Muhammad Mirza et al., entitled "System and Method of Use for a Network Interface Dashboard of a Heating, Ventilation and Air Conditioning Network".
Related case U.S. Appl. No. 12/603,502, filed Oct. 21, 2009 to Jacob Jennings et al., entitled "System and Method of Use for a User Interface Dashboard of a Heating, Ventilation and Air Conditioning Network".
Related case U.S. Appl. No. 12/603,489, filed Oct. 21, 2009 to Wojciech Grohman et al., entitled "System and Method for Zoning a Distributed-Architecture Heating, Ventilation and Air Conditioning Network".
Related case U.S. Appl. No. 12/603,527, filed Oct. 21, 2009 to Darko Hadzidedic, entitled "Memory Recovery Scheme and Data Structure in a Heating, Ventilation and Air Conditioning Network".
Related case U.S. Appl. No. 12/603,479, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,536, filed Oct. 21, 2009 to Timothy Wallaert et al., entitled "Communication Protocol System and Method for a Distributed-Architecture Heating, Ventilation and Air Conditioning Network".
Related case U.S. Appl. No. 12/603,509, filed Oct. 21, 2009 to Timothy Wallaert et al., entitled "System and Method of Use for a User Interface Dashboard of a Heating, Ventilation and Air Conditioning Network".
Related case U.S. Appl. No. 12/603,512, filed Oct. 21, 2009 to Wojciech Grohman et al., entitled "Programming and Configuration in a Heating, Ventilation and Air Conditioning Network".
Related case U.S. Appl. No. 12/603,464, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,528, filed Oct. 21, 2009 to Wojciech Grohman et al., entitled "Memory Recovery Scheme and Data Structure in a Heating, Ventilation and Air Conditioning Network".
Related case U.S. Appl. No. 12/603,525, filed Oct. 21, 2009 to Wojciech Grohman et al., entitled "Method of Controlling Equipment in a Heating, Ventilation and Air Conditioning Network".
Related case U.S. Appl. No. 12/603,520, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,539, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,420, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,483, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,514, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,515, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,490, filed Oct. 21, 2009 to Wojciech Grohman, entitled "System Recovery in a Heating, Ventilation and Air Conditioning Network".
Related case U.S. Appl. No. 12/603,523, filed Oct. 21, 2009 to Wojciech Grohman et al., entitled "Alarm and Diagnostics System and Method for a Distributed-Architecture Heating, Ventilation and Air Conditioning".
Related case U.S. Appl. No. 12/603,493, filed Oct. 21, 2009 to Wojciech Grohman et al., entitled "System Recovery in a Heating, Ventilation and Air Conditioning Network".
Related case U.S. Appl. No. 12/603,547, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,531, filed Oct. 21, 2009 to Wojciech Grohman, entitled "Memory Recovery Scheme and Data Structure in a Heating, Ventilation and Air Conditioning Network".
Related case U.S. Appl. No. 12/603,555, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,562, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,566, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,451, filed Oct. 21, 2009 to Timothy Wallaert, entitled "Alarm and Diagnostics System and Method for a Distributed-Architecture Heating, Ventilation and Air Conditioning Network".
Related case U.S. Appl. No. 12/603,553, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,487, filed Oct. 21, 2009 to Wojciech Grohman, entitled "System Recovery in a Heating, Ventilation and Air Conditioning Network".
Related case U.S. Appl. No. 12/603,558, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,468, filed Oct. 21, 2009 to Wojciech Grohman et al., entitled "Programming and Configuration in a Heating, Ventilation and Air Conditioning Network".
Related case U.S. Appl. No. 12/603,560, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,519, filed Oct. 21, 2009 to Thomas Pavlak, entitled "System and Method of Use for a User Interface Dashboard of a Heating, Ventilation and Air Conditioning Network".
Related case U.S. Appl. No. 12/603,499, filed Oct. 21, 2009 to Jimmy Curry et al., entitled "Alarm and Diagnostics System and Method for a Distributed-Architechture Heating, Ventilation and Air Conditioning Network".
Related case U.S. Appl. No. 12/603,534, filed Oct. 21, 2009 to Timothy Wallaert et al., entitled "Flush Wall Mount Thermostat and In-Set Mounting Plate for a Heating, Ventilation and Air Conditioning System".
Related case U.S. Appl. No. 29/345,748, filed Oct. 21, 2009 to Timothy Wallaert et al., entitled "Thin Cover Plate for an Electronic System Controller".
Related case U.S. Appl. No. 29/345,747, filed Oct. 21, 2009 to Timothy Wallaert et al., entitled "Thin Cover Plate for an Electronic System Controller".

(56) References Cited

OTHER PUBLICATIONS

Bruggeman, E., et al., "A Multifunction Home Control System," IEEE Transactions on Consumer Electronics, CE-29, Issue 1, Feb. 1983, 10 pages.

Sharma, A., "Design of Wireless Sensors Network for Building Management Systems," University of California-Berkley, 2003, 57 pages.

"Define Track at Dictionary.com," http://dictionary.reference.com/browse/track, Mar. 12, 2013, 3 pages.

"Definition of Track by Macmillan Dictionary," http://www.macmillandictionary.com/dictionary/british/track, Mar. 12, 2013, 4 pages.

"Definition of track by the Free Online Dictionary, Thesaurus, and Encyclopedia," http://www.thefreedictionary.com/track, Mar. 12, 2013, 6 pages.

"Field Display for Tridium JACE Controllers Product Data," HVAC Concepts, Inc. 2005, 22 pages.

"HVAC Concepts," JACE Network-Installation, 2004, 2 pages.

"Definition of encase," The Free Dictionary, http://www.thefreedictionary.com/encase, 2013, 2 pages.

Checket-Hanks, B., "Zoning Controls for Convenience's Sakes, High-End Residential Controls Move Into New Areas," Air Conditioning, Heating & Refrigeration News, ABI /INFORM Global, Jun. 28, 2004, 3 pages.

Leeb, G., "A User Interface for Home-Net," IEEE Transactions on Consumer Electronics, vol. 40, Issue 4, Nov. 1994, pp. 897-902.

"IPMI—Intelligent Platform Management Interface Specification v1.5," Document Revision 1.1, Intel Hewlett-Packard NEC Dell, Feb. 20, 2002, 460 pages.

Nash, H., "Fire Alarm Systems for Health Care Facilities," IEEE Transactions on Industry Applications, vol. 1A-19, No. 5, Sep./Oct. 1983, pp. 848-852.

Bruggeman, E., et al., "A Multifunction Home Control System," IEEE Transactions on Consumer Electronics, CE-29, Issue 1, 10 pages, 1983.

Fischer, H., et al., "Remote Building Management and DDc-Technology to Operate Distributed HVAC-Installations," The first International Telecommunications Energy Special Conference, TELESCON '94, Apr. 11-15, 1994, pp. 127-132.

Gallas, B., et al., "Embedded Pentium® Processor System Design for Windows CE," WESCON 1998, pp. 114-123.

"iView-100 Series (iView/iView-100-40) Handheld Controller User's Manual," ICP DAS, Mar. 2006, Version 2.0.

"Spectre™ Commercial Zoning System, Engineering Data," Lennox, Bulletin No. 210366E, Oct. 2002, 33 pages.

Sharma, A., "Design of Wireless Sensors Network for Building Management Systems," University of California-Berkley, 57 pages, 2003.

"Linux Programmer's Manual," UNIX Man Pages: Login (1), http://unixhelp.ed.ac.uk/CGI/man-cgi?login, Util-linux 1.6, Nov. 4, 1996, 4 pages.

\* cited by examiner

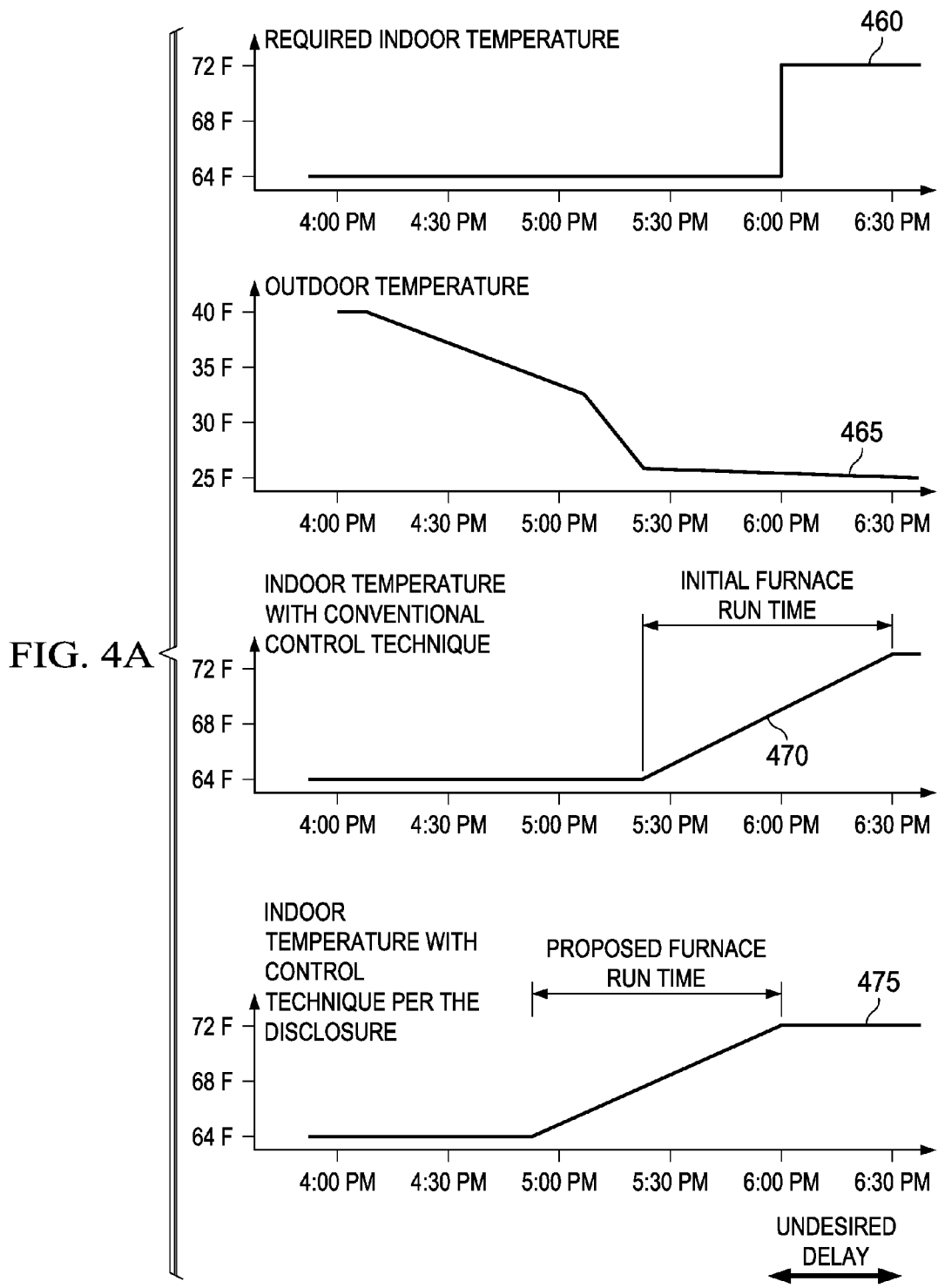

GENERAL CONTROL TECHNIQUES IN A HEATING, VENTILATION AND AIR CONDITIONING NETWORK

CROSS-REFERENCE TO RELATED APPLICATIONS

This application claims the benefit of U.S. Provisional Application Serial No. 61/167,135, filed by Grohman, et al., on Apr. 6, 2009, entitled "Comprehensive HVAC Control System"and U.S. Provisional Application Serial No. 61/852, 676, filed by Grohman, et al., on Apr. 7, 2009, and is also a continuation-in-part application of application Ser. No. 12/258,659, filed by Grohman on Oct. 27, 2008, entitled "Apparatus and Method for Controlling an Environmental Conditioning Unit," all of which are commonly assigned with this application and incorporated herein by reference. This application is also related to the following U.S. patent applications, which are filed on even date herewith, commonly assigned with this application and incorporated herein by reference:

| Serial No. | Inventors | Title |
|---|---|---|
| [Attorney Docket No. 080161] | Grohman, et al. | "Alarm and Diagnostics System and Method for a Distributed-Architecture Heating, Ventilation and Air Conditioning Network" |
| [Attorney Docket No. 070064] | Wallaert, et al. | "Flush Wall Mount Control Unit and In-Set Mounting Plate for a Heating, Ventilation and Air Conditioning System" |
| [Attorney Docket No. 070027] | Thorson, et al. | "System and Method of Use for a User Interface Dashboard of a Heating, Ventilation and Air Conditioning Network" |
| [Attorney Docket No. 070016] | Grohman | "Device Abstraction System and Method for a Distributed-Architecture Heating, Ventilation and Air Conditioning Network" |
| [Attorney Docket No. 070079] | Grohman, et al. | "Communication Protocol System and Method for a Distributed-Architecture Heating, Ventilation and Air Conditioning Network" |
| [Attorney Docket No. 080151] | Hadzidedic | "Memory Recovery Scheme and Data Structure in a Heating, Ventilation and Air Conditioning Network" |
| [Attorney Docket No. 080173] | Grohman | "System Recovery in a Heating, Ventilation and Air Conditioning Network" |
| [Attorney Docket No. 080131] | Grohman, et al. | "System and Method for Zoning a Distributed-Architecture Heating, Ventilation and Air Conditioning Network" |
| [Attorney Docket No. 080163] | Grohman, et al. | "Method of Controlling Equipment in a Heating, Ventilation and Air Conditioning Network" |
| [Attorney Docket No. 080160] | Grohman, et al. | "Programming and Configuration in a Heating, Ventilation and Air Conditioning Network" |

TECHNICAL FIELD

This application is directed, in general, to distributed-architecture heating, ventilation and air conditioning (HVAC) system, more specifically, to general control techniques in an HVAC network.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler or, or more colloquially, a fan or blower), heat air (typically by means of a furnace) or cool air (typically by means of a compressor-driven refrigerant loop). A thermostat is typically included in the climate control systems to provide some level of automatic temperature control. In its simplest form, a thermostat turns the climate control system on or off as a function of a detected temperature. In a more complex form, a thermostat may take other factors, such as humidity or time, into consideration. Still, however, the operation of a thermostat remains turning the climate control system on or off in an attempt to maintain the temperature of the premises as close as possible to a desired setpoint temperature. Climate control systems as described above have been in wide use since the middle of the twentieth century.

SUMMARY

A first aspect provides a bus, a compressor coupled to the bus, and a subnet controller coupled to the bus. In an embodiment, the subnet controller disables the compressor when acting upon a dehumidification command.

A second aspect provides a method for employing an HVAC network. In an embodiment, the method includes receiving a dehumidification command; and disabling a compressor coupled to the HVAC network when acting upon the dehumidification command.

A third aspect provides an HVAC network. In an embodiment, the network includes a bus, a compressor coupled to the bus, and a subnet controller coupled to the bus. The subnet controller disables the compressor when acting upon a dehumidification command, and wherein the dehumidification command is received by the subnet controller over an Internet.

BRIEF DESCRIPTION

Reference is now made to the following descriptions taken in conjunction with the accompanying drawings, in which:

FIGS. 4A and 4B are an illustration of a heating and cooling scenario employing the exemplary weather prediction flow of FIG. 4;

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose and perhaps able to repair itself, may require fewer, simpler repairs and may have a longer service life.

Figure 1:
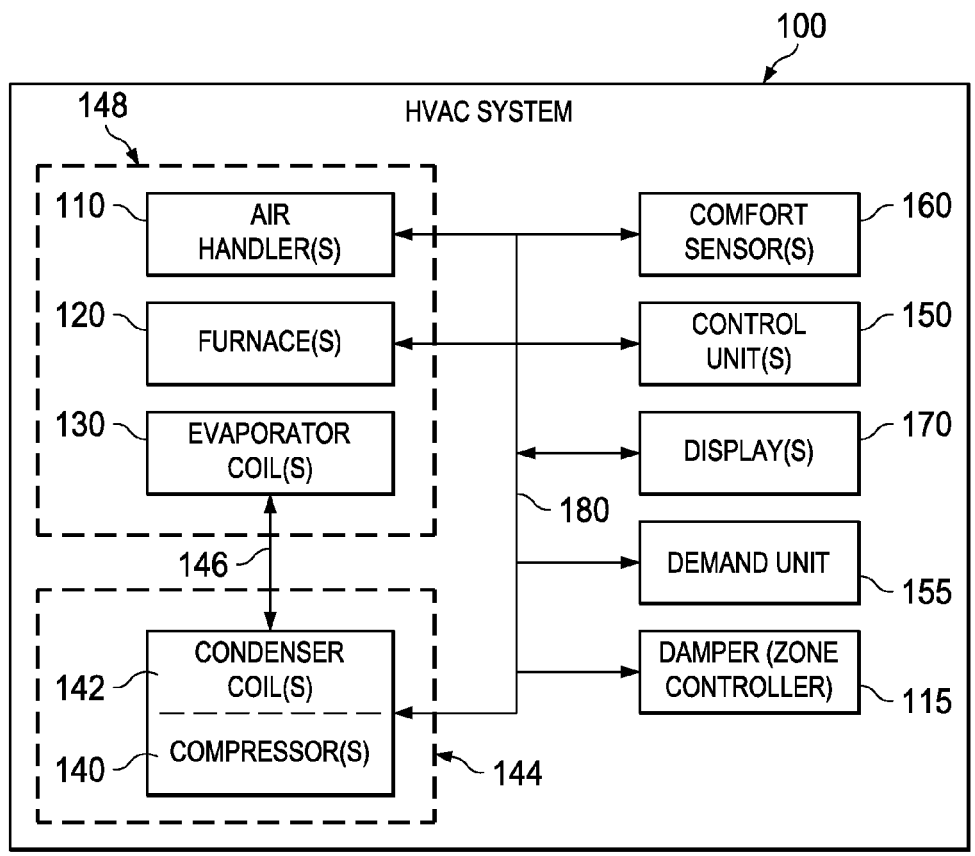
FIG. 1 is a high-level block diagram of an HVAC system within which a device abstraction system and method may be contained or carried out.

FIG. 1 is a high-level block diagram of an HVAC system, generally designated 100. The HVAC system may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In the context of a zoned system 100, the one or more dampers 115 may be referred to as zone controllers 115. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated in one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, or air circulation. The demand unit 155 may provide more than one service, and if so, one service may be a primary service, and another service may be an ancillary service. For example, for a cooling unit that also circulates air, the primary service may be cooling, and the ancillary service may be air circulation (e.g. by a blower).

The demand unit 155 may have a maximum service capacity associated therewith. For example, the furnace 120 may have a maximum heat output (often expressed in terms of British Thermal Units, or BTU), or a blower may have a maximum airflow capacity (often expressed in terms of cubic feet per minute, or CFM). In some cases, the addressable unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator coils 130, the one or more condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages.

Figure 2:
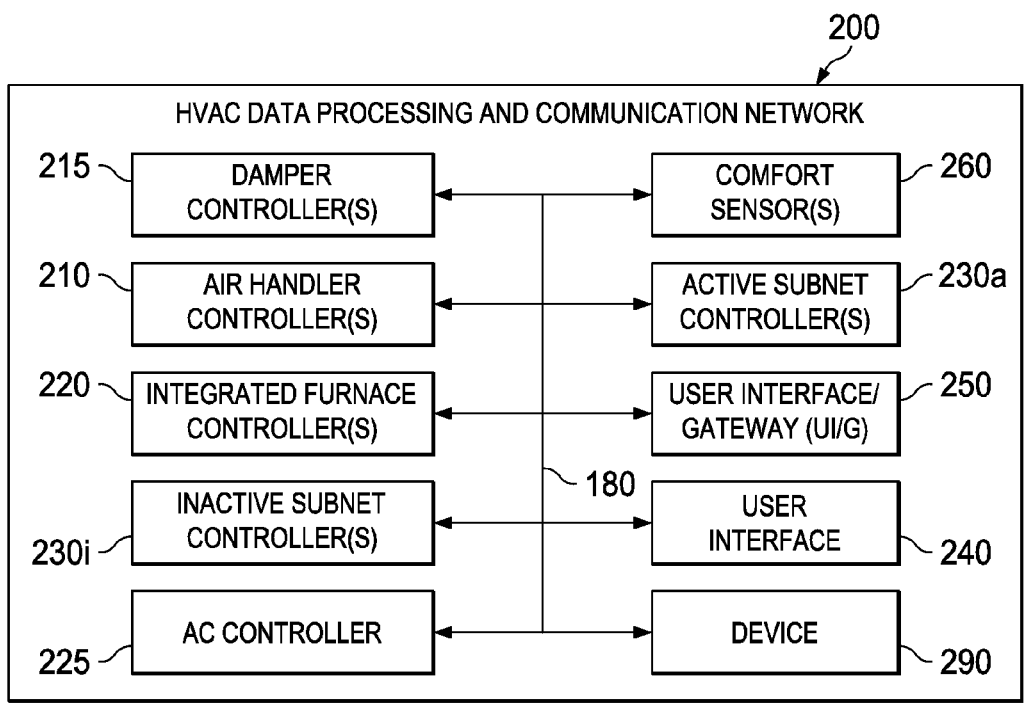
FIG. 2 is a high-level block diagram of one embodiment of an HVAC data processing and communication network 200.

FIG. 2 is a high-level block diagram of one embodiment of an HVAC data processing and communication network 200 that may be employed in the HVAC system 100 of FIG. 1. One or more air handler controllers ("AHCs") 210 may be associated with the one or more air handlers 110 of FIG. 1. One or more integrated furnace controllers ("IFCs") 220 may be associated with the one or more furnaces 120. One or more damper controller modules 215, also referred to as a zone controller module 215, may be associated with the one or more dampers 114 the interface the one or more dampers to the data bus 180. One or more AC controllers 225 may be associated with one or more evaporator coils 130 and one or more condenser coils 142 and compressors 140 of FIG. 1. The network 200 includes an active subnet controller ("aSC") 230a and an inactive subnet controller ("iSC") 230i. The aSC 230a is responsible for configuring and monitoring the system 100 and for implementation of heating, cooling, air quality, ventilation or any other functional algorithms therein. Two or more aSCs 230a may also be employed to divide the network 200 into subnetworks, or subnets, simplifying network configuration, communication and control. The iSC 230i is a subnet controller that does not actively control the network 200. In some embodiments, the iSC 230i listens to all messages passed over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260 may provide an interface between the data bus 180 and each of the one or more comfort sensors 160.

Each of the components 210, 220, 225, 230a, 230i, 240, 250, 260 may include a general interface device configured to interface to the bus 180, as described below. (For ease of description any of the networked components, e.g., the components 210, 220, 225, 230a, 230i, 240, 250, 260, may be referred to generally herein as a device 290. In other words, the device 290 of FIG. 2 is a proxy for any of a furnace, a heat pump, a subnet controller, etc, and that device's associated interface means.) The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. In wireless embodiments, the data bus 180 may be implemented, e.g., using Bluetooth™ or a similar wireless standard.

In the illustrated embodiment, a user interface ("UI") 240 provides a means by which a person may communicate with the remainder of the network 200. In an alternative embodiment, a user interface/gateway ("UI/G") 250 provides an approach by which a remote person or remote equipment may communicate with the remainder of the network 200. Such a remote person or equipment is referred to generally as a remote entity. Components connected to the data bus 180 may be referred to in the following description generally as a bus interface 260, also referred to herein simply as an "interface 260." The interface 260 may provide network interface functions to any of the aforementioned HVAC system components, e.g., the air handler 110, furnace 120, coils 130 or compressor 140 over the data bus 180. The data bus 180, which may be referred to hereinafter as a residential serial bus, or RSBus, provides communication between or among the aforementioned elements of the network 200. It should be understood that the use of the term "residential" is nonlimiting; the network 200 may be employed in any premises whatsoever, personal or business, fixed or mobile.

Generally, the network 200 allows for the remote comfort sensors 160, the controller 150, and user display 165 and/or remote user displays 170 to operate independently as separate logical units, and can be located in separate locations within the network 200. This is unlike the prior art, wherein these functionalities were required to be located within a single physical and logical structure.

Figure 3A:
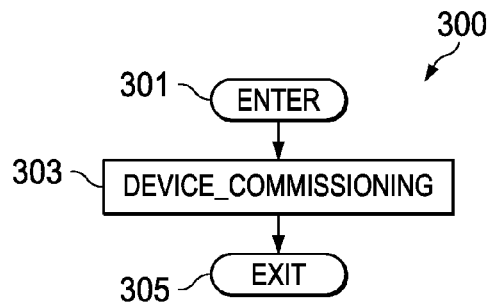
FIG. 3A is a diagram of a series of steps in an event sequence that depicts a device commissioning in an HVAC network having an active subnet controller.

Turning now to FIG. 3A, illustrated is a diagram 300 of a series of steps that occur in relation to a commissioning of the unit 155 in the illustrated embodiment. The diagram 300 includes an enter state 301, a device commissioning state 303, and an exit state 305. The HVAC system 100 can be described as being partitioned into a plurality of subnets, each subnet controlled by its own active subnet controller 230a.

Device commissioning can generally be defined as setting operational parameters for a device in the network of the HVAC system, including its installation parameters. Generally, device commissioning 300 is used by the subnet controller 230 when it is active to: a) set operating "Installer Parameters" for a networked device, such as air handlers 110, (henceforth to be referred to collectively, for the sake of convenience, as the unit 155, although other devices are also contemplated), b) to load UI/Gs 240, 250 with names and settings of "Installer Parameters and Features" of the units 155, c) to configure replacement parts for the units 155, and d) to restore values of "Installer Parameters and Features" in units 155 if those "Parameters and Features" were lost due to memory corruption or any other event. Device commissioning is a process used in the HVAC system 100, either in a "configuration" mode or in a "verification" mode.

In the illustrated embodiment and in the "configuration" mode, the unit 155 shares its information with the subnet controller 230a in an anticipation of being employable in the HVAC system 100, and an appropriate subnet. Generally, the commissioning process 300 provides a convenient way to change or restore functional parameters, both for the subnet controller 230a and the unit 155.

In both the "verification" mode and the "configuration" mode, the unit 155 is checked for memory errors or other configuration or programming errors. There are differences in device 290 behavior between the "configuration" mode and in the "verification" mode, to be detailed below.

The "subnet startup" mode programs the subnet controller 230 to be active. The "subnet startup" mode enables subnet communications, (i.e., communication within a subnet), and also deactivates a "link" sub-mode. A "link" mode may be generally defined as a mode that allows a number of subnets to work together on the same HVAC network 200, and that assigns subnet numbers for each subnet to allow this communication.

The "installer test" mode is employed when an installer installs and tests aspects and units of the HVAC system 100. The "normal operations" mode is an ongoing operation of devices 290 of the HVAC system 100 in a normal use.

More specifically, the device commissioning state machine 300 can be employed in: a) the "configuration" mode, which is invoked when transitioning to the commissioning state from the "subnet startup mode" or "installer test" mode, or the "normal mode," or b) a "verification" mode. In the illustrated embodiment, the "verification" mode is invoked when transitioning to the commissioning state from the "subnet startup" mode.

The following describes an illustrative embodiment of a process of commissioning 300 the HVAC unit 155, first for a "configuration" mode, and then for a "verification" mode.

The process of commissioning differs from a "subnet startup," in that commissioning requires that the network configuration, including configuration and activation of subnet controllers 230, has already been completed before the commissioning 300 of the device 260 can start. In the illustrated embodiment, there can be more than one subnet controller 230 on a subnet, but only subnet controller 230a is active at any one time.

In one embodiment, in order to enter into the state 320 of the process 300 in the "configuration" mode, the unit 155 receives either: a) an "aSC" ('active subnet controller') Device Assignment message," having "Assigned State" bits set to "Commissioning"; or b) a receipt of an "aSC Change State" message, with "New aSC State" bits set to "Commissioning," from the active subnet controller 230. For both "configuration" and "verification" modes, an "aSC Device Assignment" message can be generally regarded as a message that assigns the unit 155 to a particular active subnet controller 230a. For both "configuration" and "verification" modes, an "aSC Change State" message can be generally regarded as a message that starts and ends employment of the commissioning state diagram 300 for the units 155 and all other devices on the subnet.

In the illustrated embodiment and in the state 320 in the configuration mode, all units 155 respond to the "aSC Device Assignment" message with their respective "Device Status" messages, indicating that the units 155 are now in commissioning process 300 due to their response to this previous message. For both "configuration" and "verification" modes, the "Device Status" message can be generally defined as message that informs the active subnet controller 230a of what actions are being taken by the unit 155 at a given time.

However, alternatively, in other embodiments, in the state 320 in the "configuration" mode, if the units 155 are instead busy, as indicated by "aSC Acknowledge" bits of the "Device Status" message sent to the subnet controller 230a set as a "Control Busy," the active subnet controller 230a will wait for the busy units 155 to clear their "aSC Acknowledge" bits before proceeding with further elements of the Commissioning 320 process. The units 155 then resend their "Device Status" messages as soon as they are no longer busy.

From this point on, all units 155 send their "Device Status" messages periodically and on any status change, both during and after the commissioning 300. If the unit 155 does not clear its "aSC Acknowledge" bits within a minute (indication its control is no longer "busy"), the active subnet controller 230a sends an "Unresponsive Device2" alarm for each such unit 155. If in "configuration" mode, the active subnet controller 230a remains in the waiting mode indefinitely, until the unit 155 responds correctly, or the subnet is reset manually or after a timeout is reached. In "verification" mode the active subnet controller 230a proceeds further to exit the state.

In the illustrated embodiment and in the "configuration" mode, each unit 155 remembers all of its optional sensors that are currently attached to it. Furthermore, each unit 155 may store a local copy in its non-volatile memory ("NVM") of all of any other unit features that it is dependent on. A unit 155 feature can be generally defined as any datum that is fixed and cannot be changed by the installer, serviceman or the home owner. Changing of a "Feature" value normally involves reprogramming of the units 155 firmware.

In at least some embodiments, a feature is something that is fixed value, that is hard-wired into a device. In other words, no installer or home owner can change it. Features are programmed into the unit 155 during a manufacturing or an assembly process. Features can be recovered in a home, during a Data non-volatile memory ("NVM") recovery substate of Commissioning state only—the recovery substate happens automatically and without installer or user intervention. In a further embodiment, parameters can be changed by the installers only. In a yet further embodiment, the HVAC system 100 employs "variables"—those can be changed by the installers and also the home owners.

In some embodiments, a "Parameter List" is normally a Feature that contains a special list of specific parameters included in the unit 155. Parameter values can be changed, and their state can be changed also (from enabled to disabled and vice-versa), but their presence is set once and for all in a given firmware version. Therefore, a list of Parameters (not their values) is also fixed, and is thus treated as a "Feature."

However, although elements of the "configuration" mode commissioning and "verification" mode commissioning are similar, when the active subnet controller 230 is in "verification" mode instead of in "configuration" mode, the active subnet controller 230a can exit commissioning 300 regardless of the value of the alarms of the units 155. However, alternatively, if the active subnet controller 230a is in "configuration" mode, the active subnet controller 230a will not exit from its commissioning state 300 for as long as at least one unit's 155 "aSC Acknowledge" flags are set to "Control Busy." In one embodiment of the "verification" mode, the active subnet controller 230a timeouts the installation and resets the subnet to default parameters.

In the "verification" mode, assuming the unit 155 operates with a non-corrupted (original or restored copy) NVM, each unit 155 checks any of its attached sensors to see if they match with the parameters that were present in a most recent configuration of the unit 155. In some embodiments, alarms are generated by the unit 155 for missing or malfunctioning sensors as soon as the faulty condition is detected, to be employed by the user interfaces and gateways present on the subnet to notify the installer or homeowner of the encountered problem. The unexpected absence of certain sensors may inhibit the operation of the unit 155 or the subnet. This is normally manifested by the signaling of the appropriate Service Bits in the Device Status message used by the active subnet controller 230a, to determine the operational viability or health of the subnet's systems.

In some embodiments, the device commissioning process 300 then transitions into a state 330, and then ends, upon either: a) the last unit 155 receiving all of unit 155 parameters that it is dependent on, when in "verification" mode; or b) upon a request by a user, when in "configuration" mode. The active subnet controller 230a then proceeds to ensure that no subnet unit 155 has its "aSC Acknowledge" flag set to a "Control Busy" state. The "aSC Acknowledge" flag not being set indicates that all of a non-volatile memory of a given unit 155 had been written to with the necessary parameters. If no "Control Busy" state is detected, the active subnet controller 230a then issues the "aSC Change State" message, which forces the unit 155 from a commissioning state to a non-commissioning state, in either a "configuration" or a "verification" mode.

In some embodiments, when the unit 155 in the process 300 fails its NVM data integrity check in an "NVM CRC Check," and the active subnet controller is unable to perform NVM Recovery, the unit 155 instead employs its default data stored in its non-volatile (Flash) memory and/or uses default calculations to initialize the data dependent on other devices in the system. The other device data to be used for commissioning could have been obtained in either the "verification" or "configuration" mode. For data or other parameters that were not transferred or generated as part of that commissioning 300 session, default values are used.

In one embodiment, upon a detection of a system configuration error, such as a missing device whose features or parameters the unit 155 depends upon, it uses the locally stored copy of the other device's features that it depends upon, and ignores any potential feature value conflicts. In another embodiment, the unit 155 uses the locally stored copy of other parameters of the unit 155 that it depends on and ignores any potential dependent parameter value conflicts. In other words, the unit 155 employs a first installed parameter as a template for a second installed parameter on a second device. In a third embodiment, the unit 155 will change its parameter or feature values only if explicitly instructed by the active subnet controller 230 or the UI/G 240, 250.

Figure 3C:
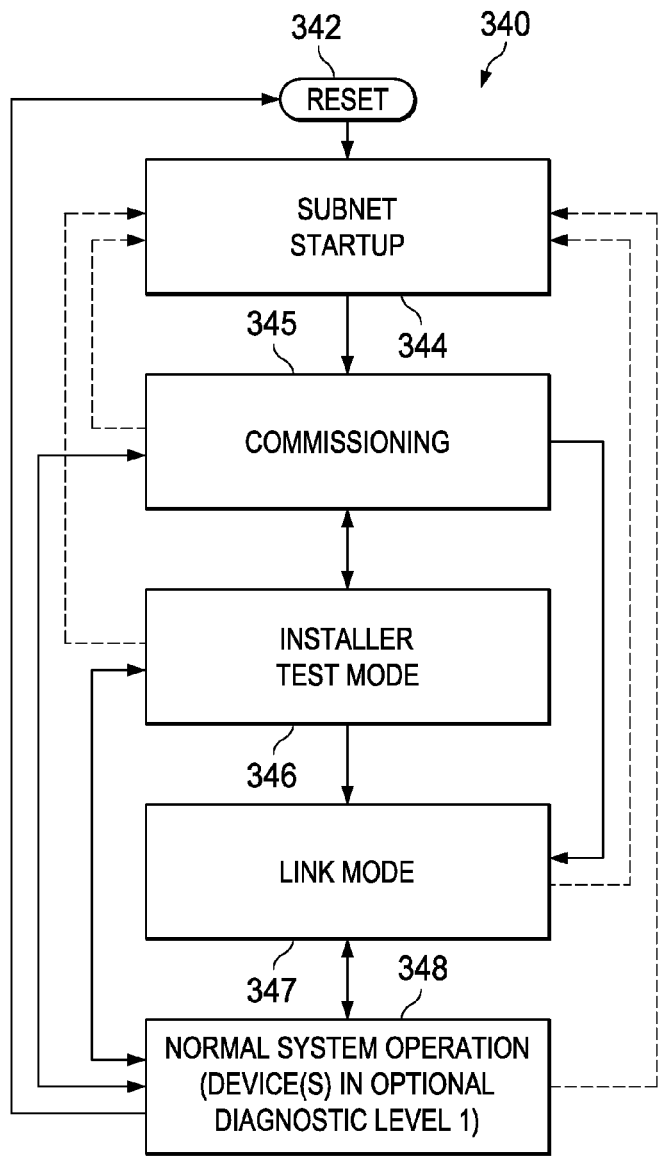
FIG. 3C is a diagram of the above series of steps of FIG. 3B to be followed by a subnet controller to synchronize with a device of the HVAC system.
Figure 3B:
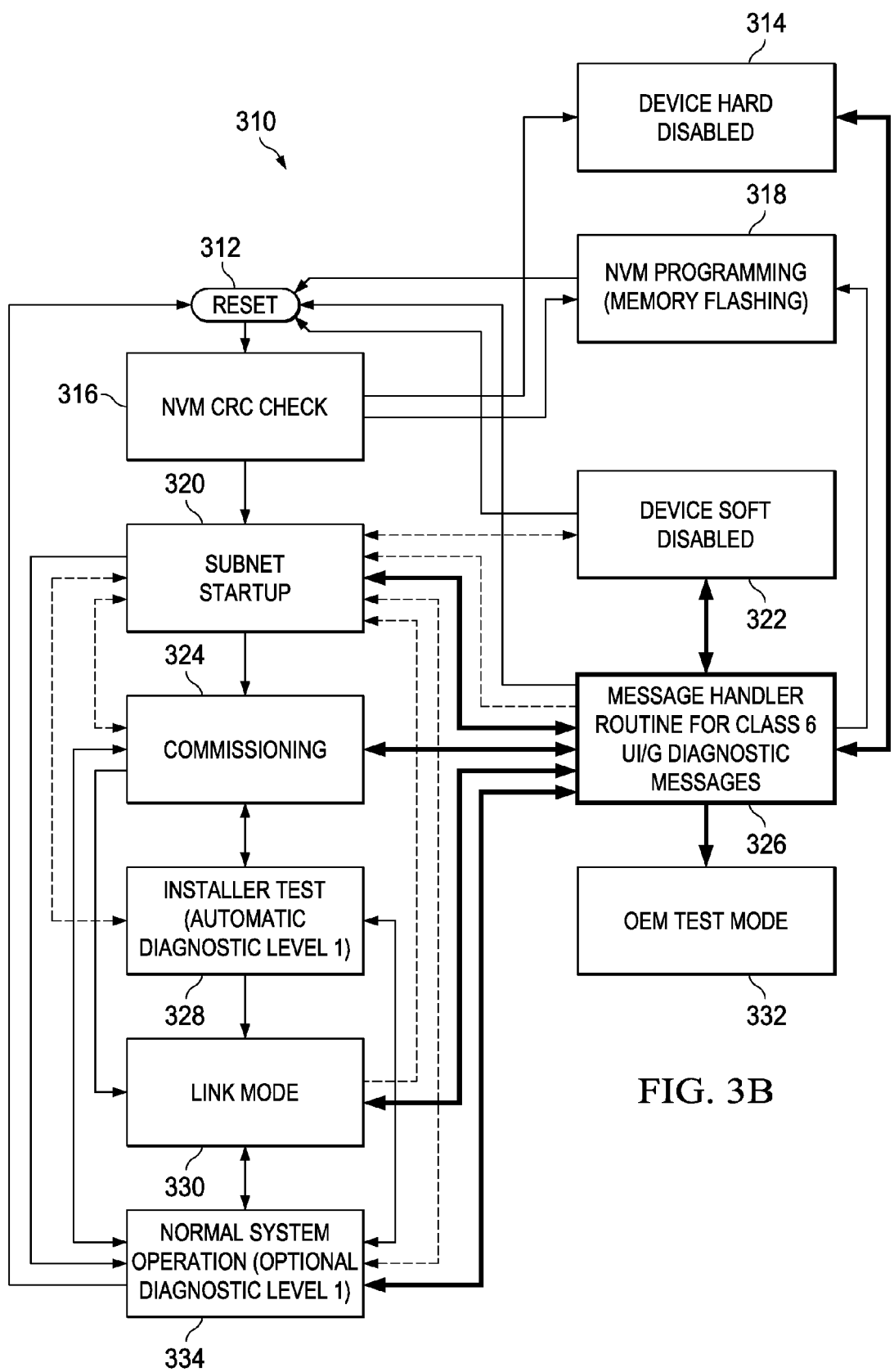
FIG. 3B is a diagram of a series of steps that occur in relation to a setting up of a subnet including an addressable unit.

Turning now to FIG. 3B, illustrated is an HVAC device state machine 310 illustrated for a subnet, including the unit 155, in more detail. Solid lines indicate normal state transitions when the subnet is transitioning from one state to another state, green lines indicate a subroutine call and red lines, alternating dotted and dashed lines indicate unexpected yet valid transitions. All states other than state 326 represent device states, and the state 326 represents a message handling routine.

As is illustrated in the present embodiment, a reset state 312 of a subnet advances to a NVM CRC check 316 for a given device (such as unit 155). If the device fails the test, the device advances to a NVM programming 318. If the device passes, however, then in subnet startup 320, the device is assigned an address (Equipment Type number) and some features and parameters of the unit 155 may be shared with the subnet. Then, in substate 324, device commissioning as described in FIG. 3A occurs. This then leads to an installer test state 328. This, in turn, then leads to a link mode startup 330, as described above. Finally, then in a step 334, normal system operation occurs, although system can reset to state 312 or be brought to states 314 or 332 via diagnostic messages handled in a state 326.

In a further embodiment, during the NVM CRC check 316, the state machine 310 can advance to a NVM programming state 318. This can occur due to such factors as a failure of a non-volatile memory, or an initial programming of the NVM. In a yet further embodiment, each of these units 155 is programmed to deal with one form of a diagnostic message regarding system errors in a state 326, and from there to testing the device 160 itself in an OEM test mode 332.

Turning now to FIG. 3C, illustrated is a state flow diagram 340 for the active subnet controller 230a in relation to the unit 155. In the illustrated embodiment, it is generally the responsibility of the active subnet controller 230a to implement proper state transitions; the other units 155 follow the explicit direction of the aSC 230a for all valid transactions. These state diagrams are included to help ensure that a state of the unit 155 is the same as the subnet controller. In the illustrated embodiment, the SC 230a is responsible for device synchronization. If the unit 155 is detected out of synch with the rest of the system, the aSC 230a, in some embodiments, immediately tries to bring the unit 155 to the current system state, if possible.

If an addressable unit 155 is detected in subnet startup 344, the subnet controller 230a applies asynchronous startup rules, which generally pertain to how many parameters are to be passed between device 290 of the addressable unit 155 and the active subnet controller 230a.

If an addressable unit 155 is detected in commissioning 345, installer test 346, link mode 347 or normal operation 348 substates, the unit 155, in some embodiments, is brought to the current state via a resend of an "aSC Change State" message, which involves transitioning from a first current aSC state to a second current aSC state.

If a unit 155 is detected in OEM Test or Soft Disabled state, the unit 155 shall be reset by the active subnet controller 230a in a step 342. If a unit 155 is detected in "Hard Disabled" or "NVM Programming" state, the active subnet controller 230a assumes that it is not available on the subnet.

In a further embodiment, inactive subnet controllers 230i are required to keep the most up to date subnet and HVAC system configuration information. Inactive subnet controllers 230i listen to all UI/G and aSC messages and continuously update their non-volatile memory to attempt to be as consistent as possible with the settings stored in active subnet controller 230a.

Various Aspects of General Control Techniques in an HVAC Network

Figure 4:
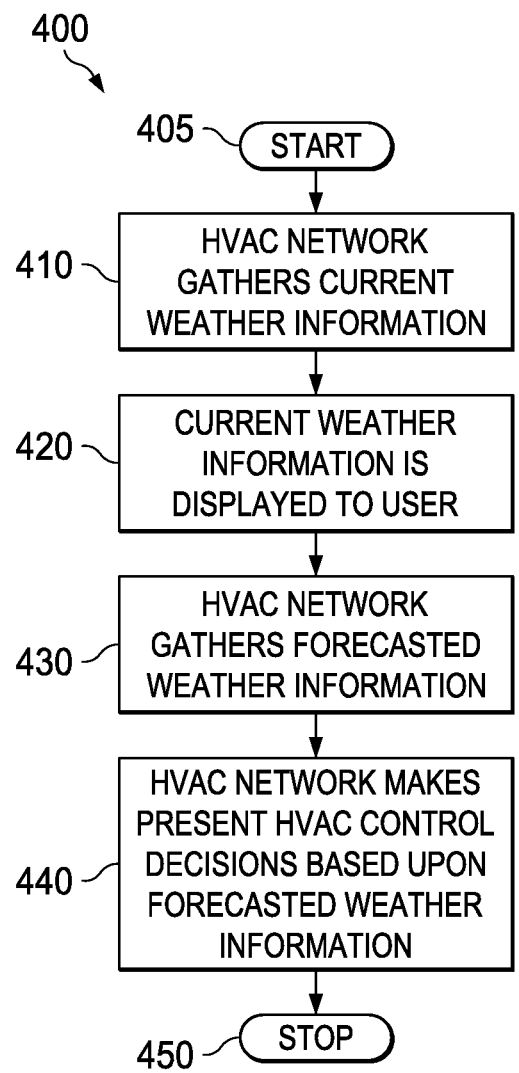
FIG. 4 is an illustration of an exemplary flow method of an ability to display weather information and forecast future HVAC network functionality.

Turning now to FIG. 4, illustrated is an exemplary method 400 for using weather information as to when to provide HVAC networked services. Prior art HVAC systems generally only use indoor temperature to make decisions on when to bring on HVAC equipment to provide conditioning to a space. Prior art HVAC systems do not predict whether outdoor conditions will change, that could affect the decision of HVAC functions.

In the illustrated embodiment, the method 400 gathers both current weather information and forecasted information. The current weather information and forecasted weather information can be displayed on the display(s) 170. This provides a homeowner or other user convenient access to this weather information, without a need to watch for this information on television, the World Wide Web, or newspaper.

In a further embodiment, the method 400 can use the forecasted weather information to make decisions on when to engage and disengage different functionalities of the HVAC network 200. For example, the indoor temperature may indicate that there is a need to bring on cooling. However, the weather forecast may indicate that the outside temperature will drop within the next few hours, and the residence will cool off due to natural cooling. Thus, the method 400 may defer the call for cooling, and instead rely on the outside temperature to drop the temperature of the residence naturally, thus saving the user money. An analogous situation applies to the furnace and heating of the residence due to a predicted warming. In some embodiments, the weather forecast can be input to the communicating system via Internet, cell phone network, phone network, cable network, satellite, or other forms of wired radio frequency communications. In another embodiment, the communication form can be wireless Internet or other forms of wireless communication.

In the method 400, after a start step 405, an HVAC network (such as the HVAC network 200) may gather current weather information in a step 410. This current weather information is displayed to a user in a step 420. In a step 430, the HVAC network gathers forecasted weather information. In a step 440, the HVAC network makes present HVAC control decisions based upon the forecasted weather information. In one embodiment, the forecasted weather information can be conveyed to the HVAC system via the U/IG 250, which can be coupled to the Internet. In another embodiment, home information to be considered by the method 400 when making present HVAC decisions is also entered in the step 440 by the user or installer. Please note that this information can be entered into the active subnet controller 230a either during commissioning or normal operation.

Generally, the method 400 allows for controlling of the HVAC system 100 to improve system performance, e.g. comfort and efficiency for a consumer. In one embodiment of the method 400, all equipment control is based on both current and forecasted temperature. Start time can depend on a present indoor temperature, outdoor temperature and overall weather forecast.

For an example of employment of the method 400, electricity prices may vary by time of day, with electric rates being less expensive before 2 pm and more expensive from 2 pm to 5 pm. If the weather forecast indicates that it will be hot in the afternoon, the method 500 may decided to "pre-cool" the space in the morning and rely on the thermal storage of the home to keep it cool in the afternoon. In this manner, the homeowner can shift their cooling energy usage to a time when electric rates are less expensive, thus saving the homeowner money.

In a further embodiment of FIG. 2 as expressed in conjunction with FIGS. 3A-3C, if the active network controller 230a generates or receives a 'dehumidify' command, the compressor 140 is disabled during a dehumidify command, thus avoiding overcooling in a given space. In some embodiments, this can be correlated to the weather prediction functionality.

Turning now to FIG. 4A, illustrated is both a prior art and current control technique according to method 400 for heating. As is illustrated in FIG. 4A, a required indoor temperature 460 is illustrated in relation to an outdoor temperature 465. In conventional systems, a furnace would turn on at a point 470, a turn-on point of outside temperature. This would overshoot a desired indoor temperature 460. However, the method 400 allows a turn on time instead at an earlier time based on a weather prediction such as in the step 440, thereby allowing the indoor temperature to reach its target temperature at a desired time.

Figure 4B:
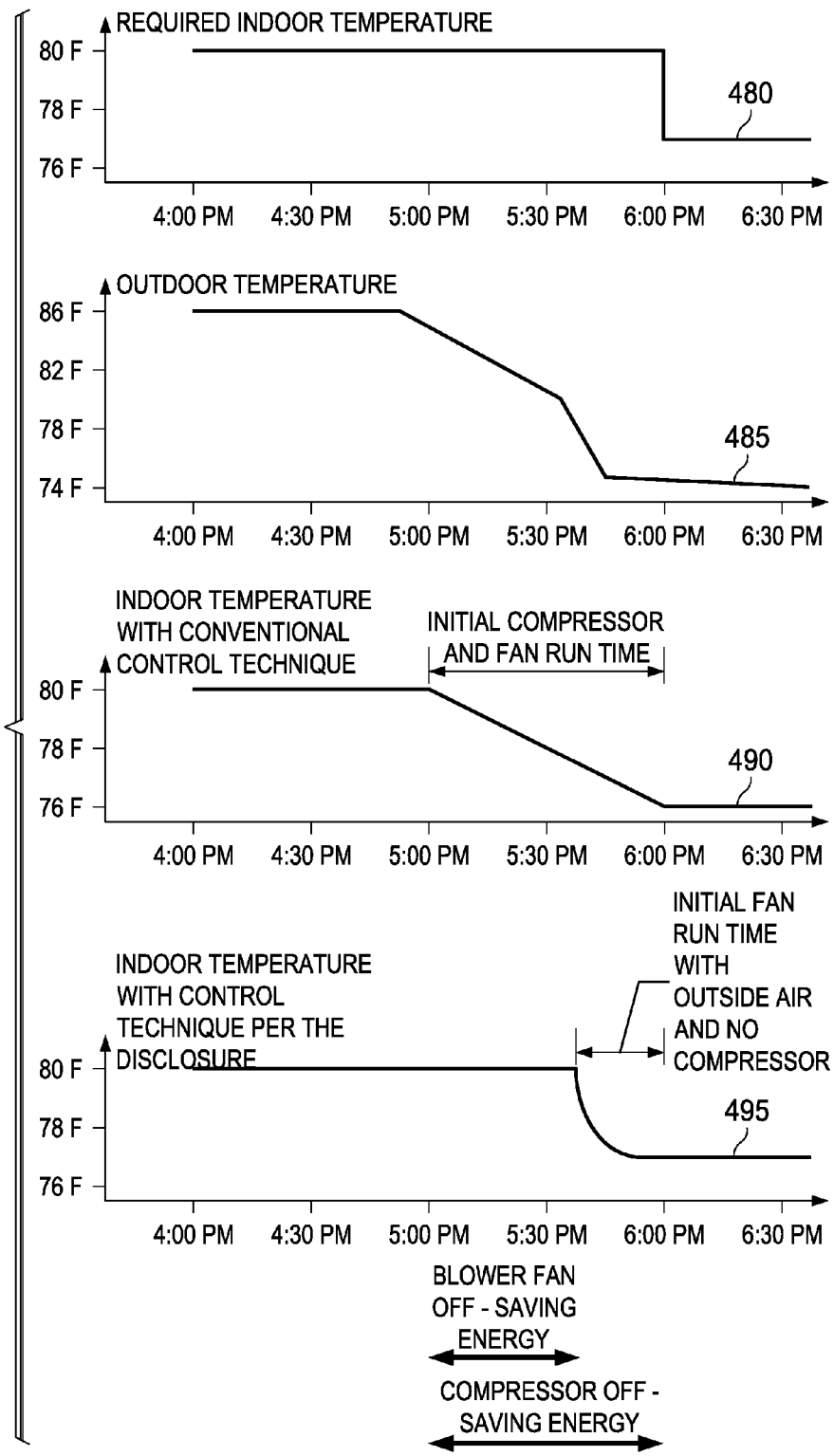

Turning now to FIG. 4B, illustrated is both a prior art and current control technique according to method 400 for cooling. As is illustrated in FIG. 4B, a required indoor temperature 480 is illustrated in relation to an outdoor temperature 485. In conventional systems, a compressor and fan would turn on at a point 490, which could require significant energy. However, the method 400 allows the cooling to be turned on at a later time 495 based on a weather prediction by using a natural coolness of the environment itself such as in the step 440, thereby allowing the indoor temperature to reach its target temperature at a desired time.

Figure 5A:
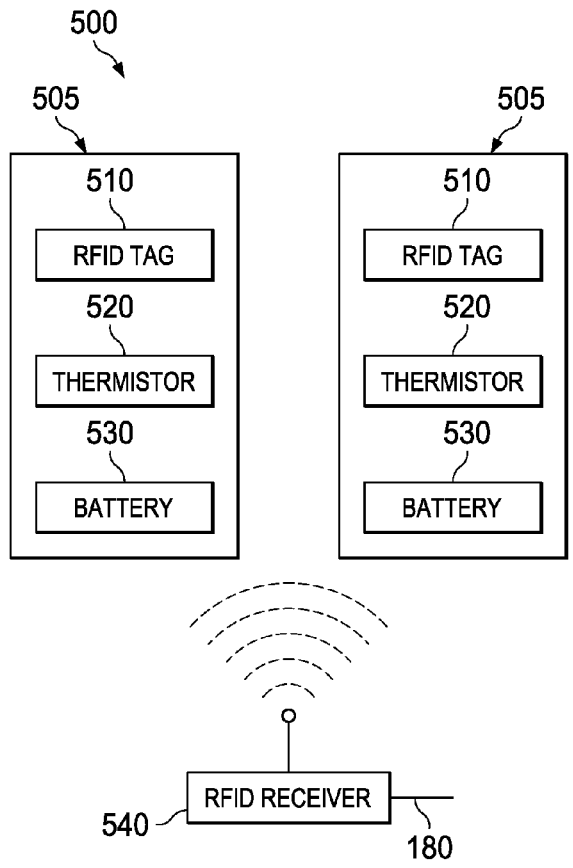
FIG. 5A is an illustration of one embodiment of RFID system for use with a remote comfort sensor in an HVAC network.

Turning now to FIG. 5A, illustrated is a system 500 for employing radio frequency identification ("RFID") with temperature and/or humidity sensors, such as the comfort sensors 280. An RFID may not need batteries to power a microprocessor. Instead, an RFID tag may use an antenna to draw power from a transmitted radio signal as well as derive information from it. A basic principle behind the latter type of RFID is when a proper frequency is transmitted, and an RFID tag draws enough power to radiate an ID or other signal, transmits its ID or another signal to a receiver and then presumably turns back off. All of this can happen without a use of batteries.

In the system 500, illustrated is a sensor 505, which can be the comfort sensor 280, although it may or may not have additional humidity sensing ability. The sensor 500 includes an RFID tag 510, a thermistor 220, and a battery 530. The system 500 also includes an RFID transceiver 540, coupled to the RS bus 180 of the HVAC network 200.

Generally, the system 500 incorporates an RFID into a remote temperature sensor, such as the sensor 505. The temp sensor includes both the RFID tag 510, which reads the thermistor 520. Therefore, the temperature sensors may not be powered all of the time, but perhaps only when the RFID receiver 540 powers up at the request of the HVAC network 200. Therefore, when the sensors 505 are powered by an RF signal, an interrogatory signal, they then read the thermistor 520, broadcast this value, and then go back to "sleep." In a further embodiment, the RF temperature sensor 505 can be incorporated with the battery 530 that only powers the thermistor so that the sensor can put all of its power received from the RFID receiver 540 into transmitting data. In a yet further embodiment, a plurality of sensors 500 are placed around a location, such as a room. The temperature sensors each have a separate broadcast frequency. In one embodiment, the sensor is motionless and thus able to receive power longer, with less loss and better reliability, so it can include low-power active circuitry whose sole purpose is to convert the ADC reading of the thermistor value into an RF message packet.

Figure 5B:
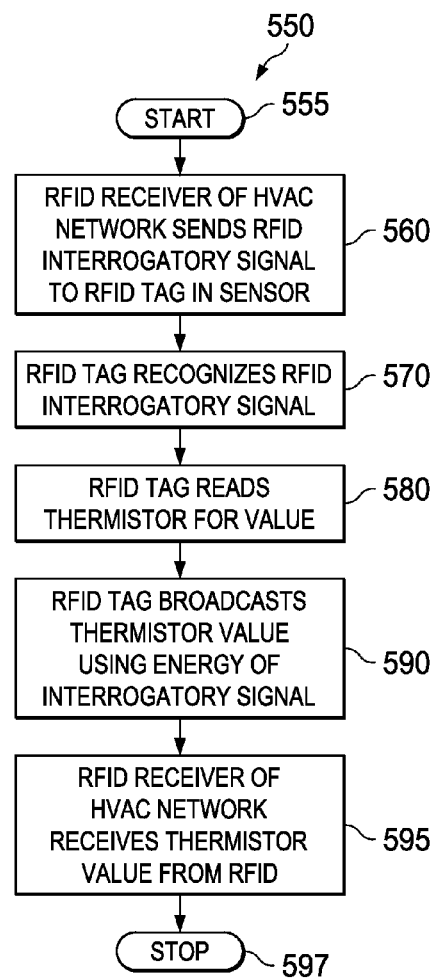
FIG. 5B is an illustration of an exemplary flow method of employment of an RFID with a remote comfort sensor.

Turning now to FIG. 5B, illustrated is an exemplary embodiment of a method 550 for reading a value, such as a temperature, in an RFID, such as the RFID tag 510, that has a value to be employed by an HVAC network, such as the HVAC network 200. After a start step 555, an RFID receiver of a HVAC network sends an interrogatory signal to an RFID tag in a sensor in a step 560, such as the RFID tag 510 in the sensor 505. In a step 570, the RFID tag recognizes the RFID interrogatory signal. In a step 580, the RFID tag reads an internal sensor, such as the thermistor, for a value. In a step 590, the RFID tag broadcasts the thermistor value using the energy of the interrogatory signal. In a step 595, the RFID receiver of the HVAC network receives the thermistor value broadcast from the RFID. The method stops in a step 597.

Those skilled in the art to which this application relates will appreciate that other and further additions, deletions, substitutions and modifications may be made to the described embodiments.

What is claimed is:

1. An HVAC network of an HVAC system that provides cooling and dehumidification for a premise, comprising:
   a data bus capable of communicating data between and among devices coupled thereto;
   a compressor coupled to said data bus and fluidly coupled to an associated condenser coil and evaporator coil to provide cooling for said HVAC system;
   a dehumidifier coupled to said data bus and independent of said compressor; and
   a subnet controller coupled to said data bus and configured to enable said compressor to provide said cooling based on a temperature associated with said premises, wherein said subnet controller is further configured to receive or generate a dehumidification command and address overcooling of said premises by disabling said compressor when said dehumidifier acts upon said dehumidification command for said HVAC system.

2. The HVAC network of claim 1, further comprising a user interface coupled to said data bus.

3. The HVAC network of claim 1, further including an RFID tag system for use with said HVAC network, comprising:
   a temperature sensor including:
      a) an RFID tag; and
      b) a thermistor; and
   an RFID receiver for receiving a reading of said thermistor by said RFID tag.

4. The RFID tag system of claim 3, wherein said temperature sensor is a comfort sensor.

5. The RFID tag system of claim 3, further comprising a battery coupled to said RFID tag.

6. The RFID tag system of claim 3, wherein a plurality of said temperature sensors are placed around a room.

7. The RFID tag system of claim 6, wherein said temperature sensors each have a separate broadcast frequency.

8. A method for employing an HVAC network of an HVAC system that provides cooling and dehumidification for a premises, comprising:
- enabling a compressor of said HVAC system to provide cooling for said premises;
- receiving a dehumidification command for said HVAC system;
- operating a stand-alone dehumidifier of said HVAC system in response to said dehumidification command; and
- preventing overcooling of said premises by disabling, via a data bus of said HVAC network, said compressor from an enabled state when said dehumidifier is operating, wherein said compressor is coupled to said data bus and fluidly coupled to an associated condenser coil and evaporator coil to provide cooling for said HVAC system.

9. The method of claim 8, further including using weather information in said HVAC network for controlling said HVAC system, comprising:
- gathering, by said HVAC network, forecasted weather information; and
- performing said enabling, said operating and said preventing based on both current weather information and said forecasted weather information.

10. The method of claim 8, further comprising wherein said HVAC network receives said forecasted weather information from the Internet, said Internet coupled to said HVAC network through a gateway.

11. The method of claim 8, further comprising:
- gathering current weather information by said HVAC network; and
- displaying said current weather information to a user.

12. The method of claim 11, wherein said HVAC system provides conditioning states for said premises selected from the group consisting of:
- a) heating;
- b) cooling;
- c) ventilating;
- d) humidifying; and
- e) dehumidifying.

13. The method of claim 8, further including employing an RFID tag in a sensor in said HVAC network, comprising:
- sending an interrogatory signal to said RFID tag in said sensor in said HVAC network;
- recognizing, by said RFID tag, said interrogatory signal;
- reading a thermistor of said sensor for a thermistor value by said RFID tag; and
- broadcasting by said RFID tag, said thermistor value.

14. The method of claim 13, further comprising an RFID receiver of said HVAC network receiving said broadcasted thermistor value from said RFID.

15. The method of claim 13, wherein said sensor is a comfort sensor that includes a humidity sensor.

16. The method of claim 14, further comprising employing a battery to read said thermistor.

17. The method of claim 14, further comprising placing a plurality of sensors each including RFID tags, around a room.

18. The method of claim 14, wherein:
- said sensors each can recognize a separate interrogatory frequency;
- said RFID is powered by its own received interrogatory frequency;
- said sensor is read by said HVAC network; and
- said sensor is not read continuously by said HVAC network.

19. An HVAC system, comprising:
- a cooling system having a compressor, a condenser coil, an evaporator coil and an air handler;
- a dehumidifier separate from said cooling system; and
- a HVAC network including:
  - a data bus capable of communicating data between and among devices coupled thereto, said compressor and said dehumidifier coupled to said data bus; and
  - a subnet controller coupled to said data bus,
- wherein said subnet controller directs said dehumidifier to act in response to a dehumidification command and address overcooling of said premises by changing said compressor from an enabled state to a disabled state when said dehumidifier is acting upon said dehumidification command, wherein said dehumidification command is received by said subnet controller over the Internet and via said data bus.

20. The HVAC network of claim 19, further comprising a user interface coupled to said data bus, wherein said subnet controller directs operation of said cooling system and said dehumidifier based on both an indoor and outdoor temperature of said premises and a weather forecast.

* * * * *